(12) United States Patent
Tse et al.

(10) Patent No.: US 8,463,100 B2
(45) Date of Patent: Jun. 11, 2013

(54) SYSTEM AND METHOD FOR IDENTIFYING, PROVIDING, AND PRESENTING CONTENT ON A MOBILE DEVICE

(75) Inventors: Hon Kwan Tse, Tsimahatsui (CN); Jonathan O. Browne, Tampa, FL (US); Joseph F. Rifkin, Long Beach, CA (US)

(73) Assignee: Cosmo Research Company Limited, Kowloon (HK)

(*) Notice: Subject to any disclaimer, the term of this patent is extended or adjusted under 35 U.S.C. 154(b) by 377 days.

(21) Appl. No.: 12/753,780

(22) Filed: Apr. 2, 2010

(65) Prior Publication Data

US 2011/0103763 A1    May 5, 2011

Related U.S. Application Data

(60) Provisional application No. 61/258,464, filed on Nov. 5, 2009.

(51) Int. Cl.
*H04N 5/85* (2006.01)

(52) U.S. Cl.
USPC ............................................. 386/201

(58) Field of Classification Search
USPC ............................................. 386/201
See application file for complete search history.

(56) References Cited

U.S. PATENT DOCUMENTS

| | | | |
|---|---|---|---|
| 6,460,180 | B1 | 10/2002 | Park et al. |
| 2002/0100063 | A1* | 7/2002 | Herigstad et al. ............. 725/141 |
| 2004/0038692 | A1 | 2/2004 | Muzaffar |
| 2004/0205822 | A1 | 10/2004 | Ullman et al. |
| 2004/0244056 | A1 | 12/2004 | Lorenz et al. |
| 2004/0268419 | A1 | 12/2004 | Danker et al. |
| 2007/0089158 | A1* | 4/2007 | Clark ............................. 725/135 |
| 2008/0092164 | A1* | 4/2008 | Agarwal et al. ................. 725/40 |
| 2008/0092201 | A1 | 4/2008 | Agarwal et al. |

FOREIGN PATENT DOCUMENTS

| | | |
|---|---|---|
| EP | 1314110 B1 | 7/2009 |
| FR | 2914128 | 9/2008 |
| JP | 2002-288995 | 9/2002 |
| WO | WO 00/44168 | 7/2000 |
| WO | WO 02084909 | 10/2002 |
| WO | WO 2008039323 | 4/2008 |

* cited by examiner

*Primary Examiner* — Thai Tran
*Assistant Examiner* — William Tran
(74) *Attorney, Agent, or Firm* — Sheppard, Mullin, Richter & Hampton LLP

(57) ABSTRACT

The present invention is embodied in a system for synchronizing a mobile device with video output by a video output device. In one embodiment, the system comprises a data reader, a remote control, and a router. The data reader is configured to be connected to a video output device for reading digital codes associated with video or audio signals output by the video output device. The remote control has a user input mechanism and is configured to transmit an activation signal to the data reader after activation of the user input mechanism. The router is configured to be connected to a wide area network for transmitting data from the data reader to a remote data server. The router is also configured to establish a local data connection between the data reader and a mobile device. The data reader, after receiving an activation signal from the remote control, is further configured to transmit data indicative of a digital code or series of digital codes read by the data reader to the remote data server via the router. Additionally, the data reader, after receiving a request signal from the mobile device, is further configured to transmit data indicative of a digital code or series of digital codes read by the data reader to the mobile device via the router.

7 Claims, 14 Drawing Sheets

Supplemental Content Identification System 200

Supplemental Content Provision System 300

Supplemental Content Presentation System 400

SYSTEM AND METHOD FOR IDENTIFYING, PROVIDING, AND PRESENTING CONTENT ON A MOBILE DEVICE

CROSS-REFERENCE TO RELATED APPLICATION

Priority is claimed under 35 U.S.C. §119(e) to U.S. Provisional Application No. 61/258,464, filed by lion Kwon Tse, Jonathan O. Browne and Joseph F. Rifkin on Nov. 5, 2009, and entitled "System and Method for Syncing Digital Game Data to Existing DVD Content." This application is incorporated by reference herein.

BACKGROUND OF THE INVENTION

This invention relates generally to supplemental content for programs output from video output devices, such as digital video disc ("DVD") players, cable television converter boxes, satellite television set-top boxes, and digital video recorders. More particularly, this invention relates to a system and method for identifying, providing, and presenting such supplemental content on a mobile device, such as a mobile phone.

Over the last thirty years, the enormous expansion of cable television channel options, plus the advent of consumer electronics devices that enable a viewer to fast-forward through commercials, has significantly reduced audience program loyalty and the effectiveness of television advertising. Television network revenues have declined as fractured audiences result in lower show ratings.

To offset these declines, product placement in television shows has become more commonplace. Product placement, however, has so far proven to be a largely clumsy, interruptive marketing tool. It also fails to provide a way for a consumer to act upon an impulse to buy the placed product. Additionally, it does little or nothing to enhance a viewer's engagement with the television show.

Partly in response to these problems, television content providers have begun experimenting with interactive television as a way to communicate better with viewers. Interactive content typically requires that a trigger code be embedded into the video stream. When a client device, such as a set-top box, detects the trigger code, an interface is displayed on the television. The interface asks a viewer whether the viewer would like to see more information related to the content being viewed. If the viewer wants more information, then the viewer selects an acceptance icon that causes the information to be sent to the viewer.

A problem with this approach is that a significant amount of effort is needed to embed the trigger codes into the video stream. Also, the interface, which appears over other content, can be disruptive. Additionally, the information sent to the viewer does little or nothing to enhance the viewer's engagement with the television show.

Attempts have been made in the prior art to solve these problems. For example, U.S. patent application Publication No. 2004/0268419 to Danker et al. describes systems and methods for broadcasting interactive content without using triggers embedded in the broadcast content. According to the abstract, when a viewer sees an item of interest while viewing a program, the viewer can initiate a request for information (RFI) about that item with a single button actuation. When the RFI is entered, a client device, such as a set-top box, detects the RFI and transmits RFI data to a server, including the channel viewed, a time stamp and—in at least one implementation—a system-defined amount of closed captioning data. The RFI data is cross-referenced with program time code information, programming guide information, program information and/or advertiser information to determine the context of the RFI, i.e., what the user saw that made the user enter the RFI. Information about the item is then sent to the viewer as a system message, an e-mail message, a post, or by way of any other delivery mode.

While the systems and methods disclosed in Danker et al. open up the possibility of impulse buying, they do little or nothing to enhance a viewer's engagement with a television show. Once the information is sent to the viewer, there is no ongoing coordination with the show. Additionally, because the system disclosed in Danker et al. relies upon time stamps and closed-captioning data instead of embedded trigger codes, it cannot determine the context of the RFI with much precision.

Another example is disclosed in U.S. patent application Publication No. 2008/0092164 to Agarwal et al. and U.S. patent application Publication No. 2008/0092201 to Agarwal et al. According to the abstract, communication networks and methods are disclosed that provide a supplemental content service. The supplemental content service provides synchronized supplemental content, such as media clips, to a user over a communication network (e.g., a mobile wireless network). A content provider offering a primary content stream (e.g., a television program) broadcasts the primary content stream to a content receiving device (e.g., a television) of the user. The content provider also generates supplemental content that is an enhancement to the primary content stream. If the user subscribes to the supplemental content service, then the communication network provides the supplemental content to the user through a communication device (e.g., a mobile phone) that is synchronized with the primary content stream. The user can then experience the supplemental content over the communication device at the same time as experiencing the primary content stream over the content receiving device.

While the system disclosed in Agarwal et al. also opens up the possibility of impulse buying, it relies upon time-based triggers to coordinate the supplemental content with the primary content stream. As a result, the system cannot coordinate the supplemental content with much precision. This limits the ability of the system to enhance a viewer's engagement with a television show. Additionally, the system requires that the content provider generate the time-based triggers in advance, limiting the flexibility of the system.

It should, therefore, be appreciated that there is a need for a system and method that use supplemental content to enhance a viewer's engagement with a television show or other video output by a video output device, while more precisely and flexibly coordinating the supplemental content with the video. The present invention satisfies this and other needs.

SUMMARY OF THE INVENTION

The present invention is embodied in a system for synchronizing a mobile device with video output by a video output device. In one embodiment, the system comprises a data reader, a remote control, and a router. The data reader is configured to be connected to a video output device for reading digital codes associated with video or audio signals output by the video output device. The remote control has a user input mechanism and is configured to transmit an activation signal to the data reader after activation of the user input mechanism. The router is configured to be connected to a wide area network for transmitting data from the data reader to a remote data server. The router is also con figured to establish a local data connection between the data reader and a mobile device.

In a particular embodiment, the data reader, after receiving an activation signal from the remote control, is further configured to transmit data indicative of a digital code or series of digital codes read by the data reader to the remote data server via the router. Additionally, the data reader, after receiving a request signal from the mobile device, is further configured to transmit data indicative of a digital code or series of digital codes read by the data reader to the mobile device via the router. Each digital code is associated with a video frame or set of video frames in the video signals output by the video output device.

In one embodiment, the remote control further comprises a microcontroller unit and an indicator light. The microcontroller unit is configured to receive a supplemental content availability signal indicating that the data reader has detected a video or audio signal for which supplemental content is available. The indicator light is operatively connected to the microcontroller unit and configured to illuminate after the microcontroller unit receives the supplemental content availability signal.

In another embodiment, the remote control is implemented on the mobile device. The user input mechanism is a touch screen on the mobile device. The touch screen is configured to display a supplemental content availability indicator after the remote control receives a supplemental content availability signal indicating that the data reader has detected a video or audio signal for which supplemental content is available.

In a further embodiment, the data reader is further configured to transmit a supplemental content availability signal to the remote control indicating that the data reader has detected a video or audio signal for which supplemental content is available. The data reader and router can be combined into one unit. The data reader may further be configured to store video identification data, compare stored video identification data with digital codes read by the data reader, and transmit data indicative of a digital code or series of digital codes read by the data reader to the remote data server upon finding a match between the stored video identification data and digital codes read by the data reader.

The present invention is also embodied in a supplemental content identification system. The system comprises a data reading tool, a data transmission tool, and a user alert tool. The data reading tool is configured to be connected to a video output device for reading digital codes associated with video or audio signals output by the video output device. The data transmission tool is operatively connected to the data reading tool and configured to be connected to a wide area network for transmitting data indicative of a digital code or series of digital codes read by the data reading tool to a remote data server. The user alert tool is operatively connected to the data reading tool and configured to provide a sensory alert after the data reading tool detects a video or audio signal for which supplemental content is available. In a particular embodiment, each of the digital codes read by the data reading tool is associated with a video frame or set of video frames in a video program.

In one embodiment, the system further comprises a video identification data storing tool and a video identification data comparing tool. The video identification data storing tool is configured to be connected to the wide area network, to receive video identification data from the remote data server, and to store the video identification data in a memory. The video identification data comparing tool is operatively connected to the video identification data storing tool and configured to compare stored video identification data with digital codes read by the data reading tool, determine whether any of the digital codes read by the data reading tool matches any of the stored video identification data, and forward matched digital codes to the data transmission tool.

In another embodiment, the data transmission tool is further configured to establish a local data connection to a mobile device, receive a request signal from the mobile device over the local data connection, and transmit data indicative of a digital code or series of digital codes read by the data reading tool to the mobile device after receipt of a request signal.

In an further embodiment, the system further comprises a user input tool operatively connected to the data transmission tool. The user alert tool is configured to provide the sensory alert by transmitting signals to a mobile device in communication with the user alert tool. The user input tool is also configured to register a user input by receiving an activation signal from the mobile device. The data transmission tool is configured to transmit data indicative of a digital code or series of digital codes read by the data reading tool to the remote data server after t le user input tool receives an activation signal from the mobile device.

The present invention is also embodied in a supplemental content provision system. The system comprises an identification tool, a retrieval tool, and a transmission tool. The identification tool is configured to receive data indicative of a digital code or series of digital codes read by a remote data reader, and identify supplemental content based upon the received data. The retrieval tool is operatively connected to the identification tool and configured to retrieve supplemental content identified by the identification tool from a database. The transmission tool is operatively connected to the retrieval tool and configured to transmit supplemental content retrieved by the retrieval tool to a remote mobile device. In a particular embodiment, the received data contains information associated with a video frame or set of video frames in a video program.

In one embodiment, the transmission tool is further configured to transmit video identification data to the remote data reader. The video identification data comprises identifiers to allow the remote data reader to identify particular video programs.

In another embodiment, the identification tool is configured to identify supplemental content by comparing the received data with video identification data stored in a database, and determining whether any of the received data matches any of the video identification data. The identification tool can be further configured to transmit a supplemental content availability signal to a mobile device if any of the received data matches any of the video identification data.

The present invention is also embodied in a supplemental content presentation system. The system comprises a display, a presentation tool, a transmission tool, and a synchronization tool. The presentation tool is configured to receive supplemental content from a remote data server and present the received supplemental content on the display. The transmission tool is operatively connected to the presentation tool and configured to establish a local data connection to a data reader connected to a video output device, and transmit a data request to the data reader. The synchronization tool is operatively connected to the transmission tool and configured to receive data indicative of a digital code or series of digital codes read by the data reader, and synchronize the presentation of the received supplemental content by the presentation tool with video or audio signals output by the video output device using the received data. In a particular embodiment, the received data contains information associated with a video frame or set of video frames in a video program output by the video output device.

In one embodiment, the system further comprises a storing tool configured to store the received supplemental content in a database for delayed presentation by the presentation tool. The received supplemental content comprises date and time data specifying a date and time for the delayed presentation.

The present invention is also embodied in a supplemental content identification method. The method comprises the steps of reading digital codes associated with video or audio signals output by a video output device, comparing the digital codes with video identification data stored in a memory, and determining whether any of the digital codes match any of the video identification data. Each of the digital codes read by the data reading tool is associated with a video frame or set of video frames in a video program.

In one embodiment, the method further comprises the steps of transmitting data indicative of a matched digital code or matched video identification data to a remote data server, and providing a sensory alert if a supplemental content availability signal is received from the remote data server within a predetermined period of time. The step of providing a sensory alert comprises transmitting an alert signal to a mobile device.

In another embodiment, the method further comprises the steps of receiving an activation signal from the mobile device, and transmitting data indicating receipt of the activation signal to the remote data server.

The present invention is also embodied in a supplemental content provision method. The method comprises the steps of receiving data indicative of a digital code or series of digital codes read by a remote data reader, comparing the received data with video identification data stored in a database, determining whether any of the received data matches any of the video identification data, retrieving supplemental content associated with matched video identification data from a database, and transmitting the supplemental content to a remote mobile device. In a particular embodiment, the received data contains information associated with a video frame or set of video frames in a video program.

In one embodiment, the method further comprises the step of transmitting at least a portion of the video identification data to the remote data reader. The transmitted video identification data comprises identifiers to allow the remote data reader to identify particular video programs.

In another embodiment, the method further comprises the step of transmitting a supplemental content availability signal to a mobile device if any of the received data matches any of the video identification data.

The present invention is also embodied in a supplemental content presentation method. The method comprises the steps of receiving supplemental content from a remote data server, transmitting a data request to a data reader connected to a video output device, receiving data indicative of a digital code or series of digital codes read by the data reader, and synchronizing the presentation of the supplemental content with video or audio signals output by the video output device using the received data. In a particular embodiment, the received data contains information associated with a video frame or set or video frames in a video program output by the video output device.

In one embodiment, the method further comprises the step of storing the supplemental content in a database for delayed presentation. The supplemental content comprises date and time data specifying a date and time for the delayed presentation.

Other features and advantages should become apparent from the following description of the preferred embodiments, taken in conjunction with the accompanying drawings, which illustrate, by way of example, the principles of the invention.

BRIEF DESCRIPTION OF THE DRAWINGS

Various embodiments of the present invention will now be described, by way of example only, with reference to the following drawings.

DETAILED DESCRIPTION OF THE PREFERRED EMBODIMENTS

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features, and teachings disclosed herein.

Network System

Figure 1:
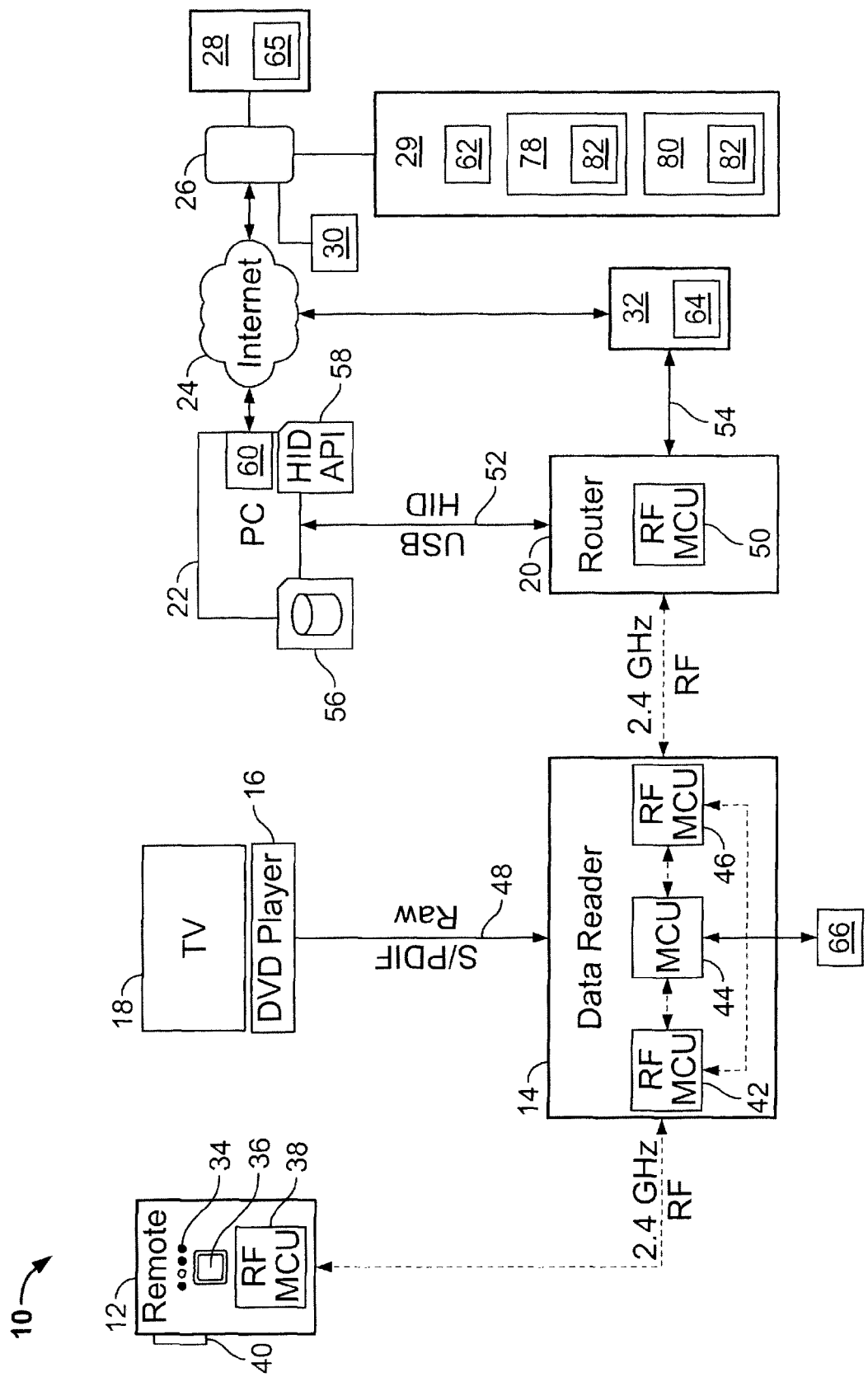
FIG. 1 is a block diagram of a network system, in accordance with an embodiment of the present invention.

With reference now to the illustrative drawings, and particularly to FIG. 1, there is shown a block diagram of a network system 10, in accordance with an embodiment of the present invention. The system comprises a remote control 12, a data reader 14, a video output device 16, a video display device 18, a router 20, a personal computer 22, a wide area network 24, a data server 26, a media mapping database 28, a supplemental content database 29, a statistics database 30, and a mobile device 32.

Figure 2:
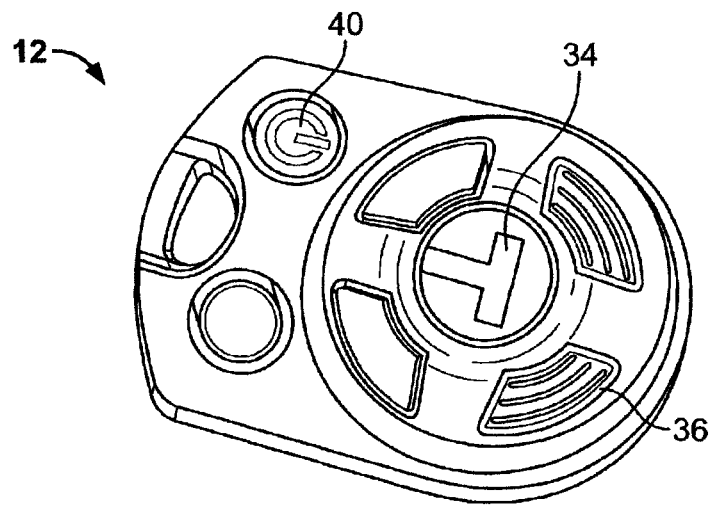
FIG. 2 is a perspective view of a remote control for use in the network system of FIG. 1.

The remote control 12 comprises one or more indicator lights 34, a user input mechanism 36, a radio frequency ("RF") microcontroller unit 38, and an on-off mechanism 40. In one embodiment, the remote control 12 is a small, keychain-style remote control, such as shown in FIG. 2. The one or more indicator lights 34 can be electroluminescent lights (such as light-emitting diodes), incandescent lights, or other lights configured to emit a soft glow after the data reader 14 detects a video or audio stream for which supplemental content (such as supplemental content 62) is available. The user input mechanism 36 can be a simple switch mechanism, such as a push button, or other suitable mechanism for registering a user input, such as a desire to receive supplemental content. The RF microcontroller unit 38 comprises an integrated circuit and an RF transceiver or transmitter-receiver configured to (1) receive signals indicating that the data reader 14 has detected a video or audio stream for which supplemental content is available; and (2) transmit an activation signal to the data reader 14 after activation of the user input mechanism 36. The on-off mechanism 40 can be a simple switch mechanism, such as a push button or sliding switch. In one embodiment, the mobile device 32 is configured to perform the functions of the remote control 12.

The data reader 14 comprises a first RF microcontroller unit 42, a main microcontroller unit 44, and a second RF microcontroller unit 46. In one embodiment, the first RF microcontroller unit 42 comprises an integrated circuit and an RE transceiver or transmitter-receiver configured to (1) receive an activation signal from the remote control 12; and (2) transmit signals to the remote control 12 indicating that the data reader 14 has detected a video or audio stream for which supplemental content (such as supplemental content 62) is available. The main microcontroller unit 44 comprises an integrated circuit configured to be operatively connected to the video output device 16 and configured to read digital codes embedded in video or audio signals output by the video output device 16. The main microcontroller unit 44 can be connected to the video output device 16 via an optical or electrical cable 48. The second RF microcontroller unit 46 comprises an integrated circuit and an RF transceiver or transmitter-receiver configured to (1) receive signals from the data server 26 and the mobile device 32 either directly or via the router 20; and (2) transmit data indicative of a digital code or series of digital codes read by the main microcontroller unit 44 to the data server 26 and the mobile device 32, either directly or via the router 20. It will be understood that the data reader 14 may have a transceiver or transmitter-receiver for communicating with the mobile device 32 separate from the transceiver or transmitter-receiver for communicating with the data sever 26.

The video output device 16 can be a DVD player, a cable television converter box, a satellite television set-top box, a digital video recorder, or another device configured to output video or audio signals. In one embodiment, the data reader 14 and the video output device 16 are combined into one unit.

The video display device 18 can be a television, a computer monitor, or another device configured to display a video steam and/or play an audio stream. In one embodiment, the video output device 16 and video display device 18 are combined into one unit.

The router 20 comprises an RF microcontroller unit 50. The RF microcontroller unit 50 comprises an integrated circuit and an RF transceiver or transmitter-receiver configured to (1) receive data indicative of a digital code or series of digital codes read by the main microcontroller unit 44; and (2) transmit signals to the data reader 14. The router 20 is configured to be connected to the wide area network 24 either directly or via a Universal Serial Bus ("USB") connection 52 to the personal computer 22 for transmitting data received from the data reader 14 to the data server 26. The router 20 is also configured to establish a local data connection 54 (such as a WiFi connection) to the mobile device 32 for transmitting data requests from the mobile device 32 to the data reader 14, and for transmitting data received from the data reader 14 to the mobile device 32.

The personal computer 22 includes hardware, software, and/or firmware generally operative to (1) receive, either directly or via the router 20, data indicative of a digital code or series of digital codes read by the main microcontroller unit 44; and (2) transmit the data to the data server 26 via the wide area network 24. In one embodiment, the personal computer 22 further includes hardware, software, and/or firmware generally operative to (1) receive data from the data server 26 via the wide area network 24; and (2) transmit the data, either directly or via the router 20, to the data reader 14. The personal computer 22 may comprise a computer-readable storage medium 56, such as a hard disk drive, a human interface device ("HID") application programming interface ("API") 58, and a communication interface 60, such as a modem. The communication interface 60 is coupled to the wide area network 24.

The wide area network 24 can be the Internet. Although FIG. 1 shows only one wide area network 24, it will be understood that multiple wide area networks may be used in the present invention, such as the Internet for communications between the personal computer 22 and the data server 26, and a separate cellular network for communications between the data server 26 and the mobile device 32.

The data server 26 includes hardware, software, and/or firmware generally operative to (1) receive, via the wide area network 24, data indicative of a digital code or series of digital codes read by the main microcontroller unit 44; (2) identify supplemental content (such as product information, advertisement data, game content, and interactive content) based upon the data indicative of the digital code or series of digital codes; (3) retrieve the identified supplemental content from the supplemental content database 29; and (4) transmit the identified supplemental content to the mobile device 32 via the wide area network 24. In one embodiment, the data server 26 further includes hardware, software, and/or firmware generally operative to (5) store data pertaining to the received data and/or the identified supplemental content in the statistics database 30; (6) create statistical reports based upon the stored data; and (7) transmit additional supplemental content from the supplemental content database 29 to the mobile device via the wide area network 24 based upon the stored data. The data server 26 can be a web server.

The mobile device 32 includes hardware, software, and/or firmware generally operative to (1) receive the identified supplemental content from the data server 26 via the wide area network 24; and (2) present the identified supplemental content to a user (e.g., via a liquid crystal display (LCD) and audio speaker). In certain embodiments, the mobile device 32 can be a mobile phone (such as the iPhone), a laptop computer, or a handheld game console (such as the Nintendo DSi or the Sony PSP Go).

In one embodiment, the mobile device 32 further comprises hardware, software, and/or firmware generally operative to transmit a data request to the data reader 14 either directly or via the local data connection 54 and router 20. Upon receipt of the data request from the mobile device 32, main microcontroller unit 44 in the data reader 14 is configured to read a digital code or series of digital codes embedded in video or audio signals then being output by the video output device 16, and to provide data indicative of the digital code or series of digital codes to the second RF microcontroller unit 46 for transmission to the mobile device 32, either directly or via the router 20 and local data connection 54. The mobile device 32, further comprises hardware, software, and/or firmware generally operative to receive the data indicative of the digital code or series of digital codes and, using the digital code or series of digital codes, to synchronize the presentation of received supplemental content with the video or audio signals being output by the video output device 16. In one embodiment, the mobile device 32 further comprises hardware, software, and/or firmware generally operative to store received supplemental content in a mobile device database 64 for later presentation to a user.

In one embodiment, each digital code embedded in the video or audio signals output by the video output device 16 is associated with a particular video frame or set of video frames in the video signals. A set of video frames can comprise a single video frame or a plurality of video frames. The digital codes can be AC-3 data. The mobile device 32 comprises hardware, software, and/or firmware generally operative to use the AC-3 data to synchronize the presentation of received supplemental content to the video frame number to which the AC-3 data is associated. More generally, the data reader 14 reads Dolby Digital (AC-3) audio data, and the mobile device 32 use the audio data to synchronize the received supplemental content. Because the AC-3 data is associated with a particular video frame or set of video frames, the data server 26 can identify supplemental content (such as supplemental content 62) specific to a particular scene in a video program, or even to a specific video frame or set of video frames in a video program.

In another embodiment, the data server 26 further includes hardware, software, and/or firmware generally operative to transmit video identification data (such as video identification data 65) to the main microcontroller unit 44 in the data reader 14 via the wide area network 24 and second RF microcontroller unit 46. The video identification data can comprise unique identifiers based upon AC-3 data for particular video programs or even specific broadcasts of a particular video program. The integrated circuit in the main microcontroller unit 44 is further configured to (1) store the video identification data in a data reader database 66; (2) compare stored video identification data with the AC-3 data output by the video output device 16; and (3) forward AC-3 data to the second RF microcontroller unit 46 for transmission to the data server 26 upon finding a match between the stored video identification data and the AC-3 data. The data server 26 includes hardware, software, and/or firmware generally operative to transmit a supplemental content availability signal to the remote control 12 or to the mobile device 32 via the wide area network and/or the data reader 14. Upon receipt of the supplemental content availability signal, the RF microcontroller unit 38 in the remote control 12 is configured to activate the one or more indicator lights 34 to indicate to a user that the data reader 14 has detected a video or audio stream for which supplemental content (such as supplemental content 62) is available.

Figure 3:
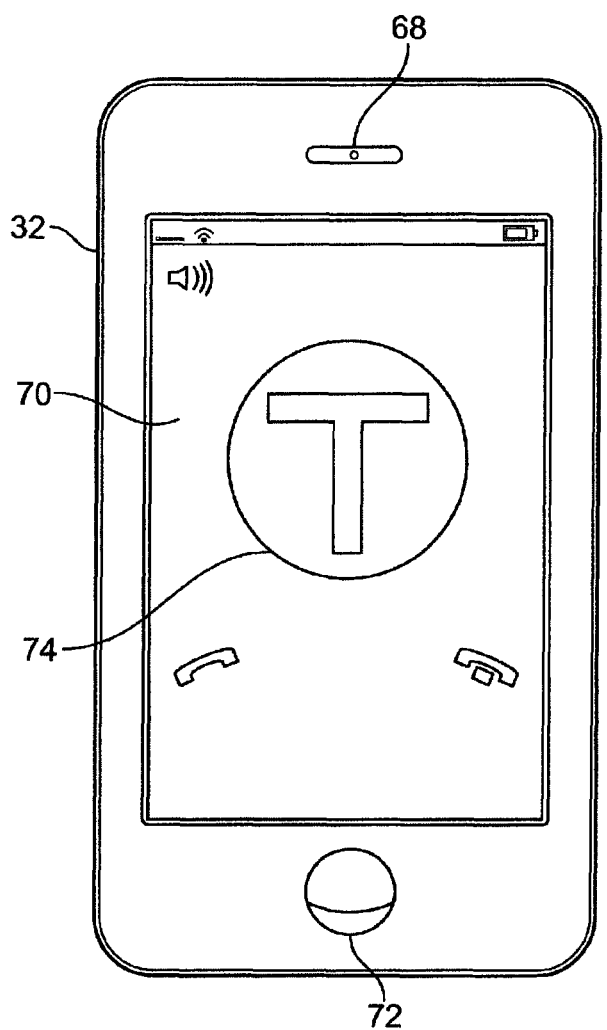
FIG. 3 is a front elevation view of a mobile device for use in the network system of FIG. 1.

With reference to FIG. 3, there is shown a front elevation view of a mobile device 32 for use in the network system 10. The mobile device 32 comprises an audio speaker 68, a display 70, and a user input mechanism 72. In embodiments for which the mobile device 32 is configured to perform the functions of the remote control 12, the display 70 performs the functions of the one or more indicator lights 34 and the user input mechanism 72 performs the functions of the user input mechanism 36. The display 70 can be an LCD display. The user input mechanism 72 can be a simple switch mechanism, such as a push button, or other suitable mechanism for registering a user input, such as a desire to receive supplemental content. In one embodiment, the display 70 is a touch screen configured to register a user input, such as a desire to receive supplemental content. In this embodiment, upon receipt of a supplemental content availability signal, the mobile device 32 is configured to display a pushbutton icon 74 on the display 70. The mobile device 32 further comprises a transceiver or transmitter-receiver 76 (FIG. 1) configured to transmit an activation signal to the data reader 14 after a user touches the pushbutton icon 74.

In one embodiment, the data server 26 further includes hardware, software, and/or firmware generally operative to transmit "preloaded" supplemental content 78 and/or a supplemental content guide 80 to the mobile device 32 via the wide area network 24. The mobile device 32 further includes hardware, software, and/or firmware generally operative to (1) receive the preloaded supplemental content 78 and/or supplemental content guide 80; and (2) store the preloaded supplemental content 78 and/or supplemental content guide 80 in the mobile device database 64 for later presentation to a user. In one embodiment, the preloaded supplemental content 78 and/or supplemental content guide 80 comprise date and time data 82 specifying a date and time for presentation on the mobile device 32 of supplemental content 62 in the supplemental content database 29 or preloaded supplemental content 78 in the mobile device database 64. At the specified date and time, the mobile device 32 can be configured either to automatically present the supplemental content 62 or preloaded supplemental content 78 to the user, or to display an icon on the display 70 indicating to the user that supplemental content 62 or preloaded supplemental content 78 is available for presentation. Upon selection of the icon, the mobile device is configured to present the supplemental content 62 or preloaded supplemental content 78 to the user. The mobile device can use AC-3 data received from the data reader 14 to synchronize the presentation of supplemental content 62 or preloaded supplemental content 78 with video or audio signals being output by the video output device 16, as described above.

General Computer

Figure 4:
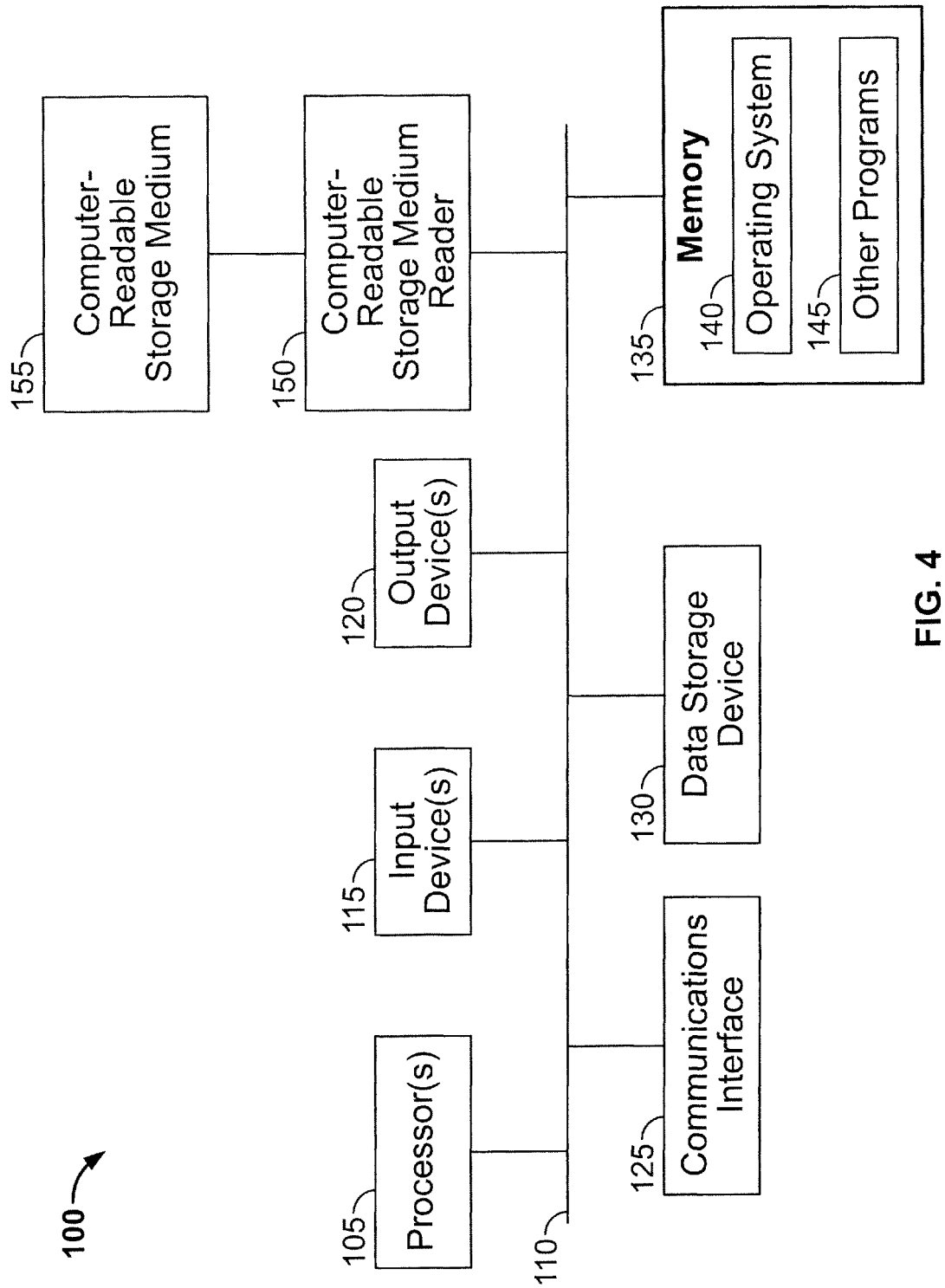
FIG. 4 is a block diagram of a computer system, in accordance with an embodiment of the present invention.

With reference to FIG. 4, there is shown a block diagram of a computer system 100. Although FIG. 1 shows the remote control 12, data reader 14, and router 20 as comprising one or more microcontrollers, each of these devices may be an instance of the computer system 100. Additionally, each of the personal computer 22, data server 26, and mobile device 32 may be an instance of the computer system 100. In other embodiments, each of the remote control 12, data reader 14, router 20, personal computer 22, data server 26, and mobile device 32 may be configured as a software implementation running on one or more computer systems 100.

The computer system 100 includes a processor 105, such as an Intel Pentium® microprocessor or a Motorola Power PC® microprocessor, coupled to a communications channel 110. The computer system 100 further includes an input device 115 (such as a keyboard or mouse), an output device 120 (such as a liquid crystal display or a cathode ray tube display), a communication interface 125, a data storage device 130 (such as a magnetic or optical disk), and memory 135 (such as random access memory (RAM)), each coupled to the communications channel 110. The communication interface 125 may be coupled to the wide area network 24 and/or may perform the functions of one or more of the various RF microcontroller units described above. One skilled in the art will recognize that, although the data storage device 130 and memory 135 are shown as different units, the data storage device 130 and memory 135 may be parts of the same unit, distributed units, virtual memory, etc. Further, it will be appreciated that the term "memory" herein is intended to cover all data storage media, whether permanent or temporary.

The data storage device and/or the memory may also store an operating system (not shown), such as Microsoft Windows 7, Linux, the IBM OS/2 operating system, the MAC OS, or the UNIX operating system. It will be appreciated that embodiments of the present invention may also be implemented on platforms and operating systems other than those mentioned. An embodiment of the present invention may be written using JAVA, C, C++ language, and/or other programming languages, possibly using object oriented programming methodology. The present invention may be built on Ruby on Rails or using Ajax.

One skilled in the art will recognize that the computer system 100 may also include additional components, such as network connections, additional memory, additional processors, local area networks (LANs), and input/output lines for transferring information across a hardware channel, the Internet or an intranet. One skilled in the art will also recognize that the programs and data may be received by and stored in the computer system 100 in alternative ways. For example, a computer-readable storage medium (CRSM) reader 145, such as a magnetic disk drive, hard disk drive, magneto-optical reader, or CPU, may be coupled to the communications channel 110 for reading a computer-readable storage medium (CRSM) 150, such as a magnetic disk, a hard disk, a magneto-optical disk, or RAM. Accordingly, the central server may receive programs and/or data via the CRSM reader.

Supplemental Content Identification System

Figure 5:
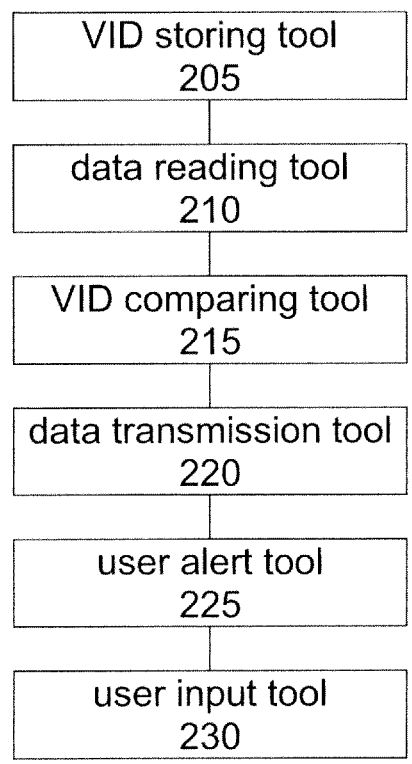
FIG. 5 is a block diagram of a supplemental content identification system, in accordance with an embodiment of the present invention.

With reference to FIG. 5, there is shown a block diagram of a supplemental content identification system 200 in accordance with an embodiment of the present invention. The supplemental content identification system 200 may be implemented on the data reader 14. The supplemental content identification system 200 includes a video identification data ("YID") storing tool 205, a data reading tool 210, a VID comparing tool 215, data transmission tool 220, a user alert tool 225, and a user input tool 230.

The VID storing tool 205 includes hardware, software, and/or firmware generally operative to store video identification data (such as video identification data 65) received from the data server 26 in the data reader database 66. The video identification data can comprise unique identifiers to allow the VID comparing tool 215 (described below) to identify particular video programs or even specific broadcasts of a particular video program based upon AC-3 data for the broadcasts or programs.

The data reading tool 210 includes hardware, software, and/or firmware generally operative to read digital codes embedded in video or audio signals output by the video output device 16. In one embodiment, the data reading tool 210 is operatively connected to the video output device 16 and identifies the Dolby Digital (AC-3) audio data embedded in the audio signals as they are output by the video output device 16.

The VID comparing tool 215 includes hardware, software, and/or firmware generally operative to compare stored video identification data with the digital codes read by the data reading tool 210 and to determine whether there is a match between any of the stored video identification data and the digital codes. Upon finding a match, the VID comparing tool is configured to forward the matched digital codes to the data transmission tool 220.

The data transmission tool 220 includes hardware, software, and/or firmware generally operative to transmit data indicative of a digital code or series of digital codes read by the data reading tool 210 to the data server 26 and/or the mobile device 32, either directly or via the router 20. The data transmission tool 220 can be configured to transmit the data after the VID comparing tool 215 finds a match, after receipt of an activation signal from the remote control 12, and/or after receipt of a data request from the mobile device 32. In one embodiment, the data transmission tool 220 is configured to transmit data to the mobile device 32 by establishing a WiFi connection to the mobile device 32.

The user alert tool 225 includes hardware, software, and/or firmware generally operative to provide a sensory alert to a user after the data reading tool 210 has detected a video or audio stream for which supplemental content (such as supplemental content 62) is available. The sensory alert may comprise a visual alert (such as illuminating an indicator light), an audio alert (such as emitting a sound), and/or a tactile alert (such as vibration). In one embodiment, the user alert tool 225 is configured to provide the alert after the VID comparing tool 215 finds a match. In another embodiment, the user alert tool 225 is configured to provide the alert after receipt of a supplemental content availability signal from the data server 26. The sensory alert may be provided to the user by transmitting signals to a remote control (such as remote control 12) or a mobile device (such as mobile device 32) in communication with the user alert tool 225.

The user input tool 230 includes hardware, software, and/or firmware generally operative to register a user input, such as a desire to receive supplemental content. In one embodiment, the user input tool 230 is configured to register the user input by receiving an activation signal from the remote control 12 or the mobile device 32. After receipt of the activation signal, the data transmission tool 220 transmits AC-3 data read by the data reading tool 210 to the data server 26 and/or the mobile device 32, triggering the presentation or storage of supplemental content (such as supplemental content 62) on the mobile device.

In one embodiment, the supplemental content identification system 200 enables impulse purchasing from television content. In this embodiment, the video identification data 65 comprises unique identifiers to allow the VID comparing tool 215 to identify, using AC-3 data read by the data reading tool 210, video scenes associated with one or more purchasable products. After the VID comparing tool 215 finds a match, the user alert tool 225 is configured provide a sensory alert to a user, such as by activating the one or more indicator lights 34 on the remote control 12 or by displaying the pushbutton icon 74 on the display 70 of the mobile device 32. The user can then register a desire to purchase one or more of the purchasable products by activating the user input mechanism 36 on the remote control 12, by activating the user input mechanism 72 on the mobile device 32, or by touching the display 70 on the mobile device if the display 70 is a touch screen. The user input tool 230 registers the user input, and the data transmission tool 220 transmits data that includes the AC-3 data and/or unique identifier for the video scene to the data server 26. The data server 26 then transmits a product information screen for the one or more purchasable products to the mobile device 32 so that the user, using the mobile device 32, can complete the purchase transaction.

Figure 8:
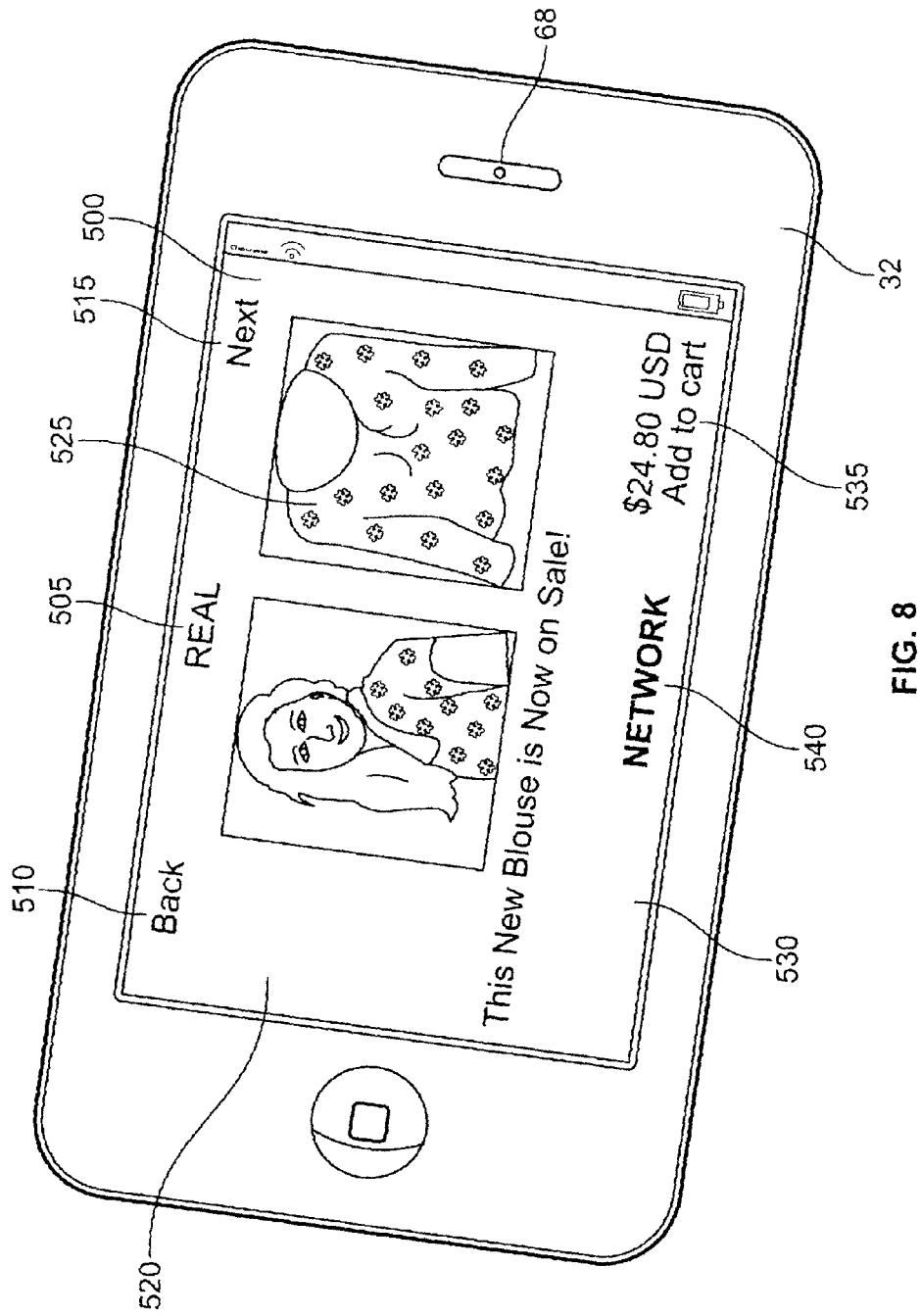
FIG. 8 is a front elevation view of a mobile device for use in the network system of FIG. 1, the mobile device displaying a screenshot of a product information screen in accordance with an embodiment of the present invention.

FIG. 8 is a front elevation view of a mobile device 32 displaying a product information screen 500 in accordance with an embodiment of the present invention. The product information screen 500 comprises a title bar 505 showing the name of a television program associated with a purchasable product, a "back" button 510 for browsing backward to a prior purchasable product (if any), a "next" button 515 for browsing forward to a next purchasable product (if any), a video frame picture 520 showing a video frame from a scene associated with the purchasable product, a product picture 525 showing the purchasable product, an information box 530 showing information about the purchasable product (such as the name and price of the purchasable product), an "add to cart" button 535 for adding the purchasable product to an e-commerce shopping cart for eventual purchase, and a network identification bar 540 showing the name of a television, cable, or satellite network associated with the television program.

Supplemental Content Provision System

Figure 6:
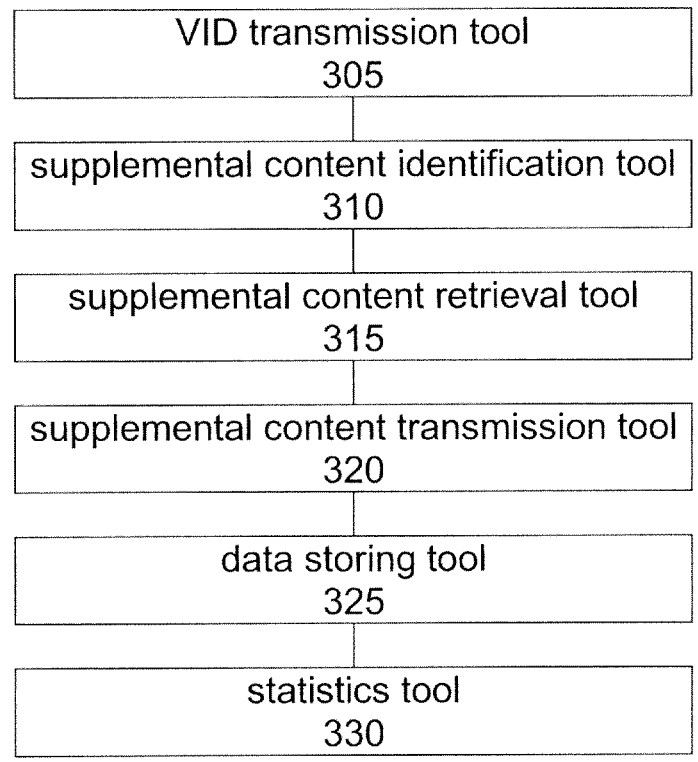
FIG. 6 is a block diagram of a supplemental content provision system, in accordance with an embodiment of the present invention.

With reference to FIG. 6, there is shown a block diagram of a supplemental content provision system 300 in accordance with an embodiment of the present invention. The supplemental content provision system 300 may be implemented on the data server 26. The supplemental content provision system 300 includes a video identification data ("VID") transmission tool 305, a supplemental content identification tool 310, a supplemental content retrieval tool 315, a supplemental content transmission tool 320, a data storing tool 325, and a statistics tool 330.

The VID transmission tool 305 includes hardware, software, and/or firmware generally operative to transmit video identification data (such as video identification data 65) to the data reader 14 via the wide area network 24. The video identification data can comprise unique identifiers to allow the data reader 14 to identify particular video programs or even specific broadcasts of a particular video program based upon AC-3 data for the broadcasts or programs.

The supplemental content identification tool 310 includes hardware, software, and/or firmware generally operative to receive, via the wide area network 24, data indicative of a digital code or series of digital codes read by the data reader 14 and to identify supplemental content (such as product information, advertisement data, game content, and interactive content) based upon the data. In one embodiment, the supplemental content identification tool 310 is configured to compare Dolby Digital (AC-3) audio data received from the data reader 14 with video identification data (such as video identification data 65) stored in the media mapping database 28 and to determine whether there is a match between any of the video identification data and the Dolby Digital (AC-3) audio data. Upon finding a match, the supplemental content identification tool 310 may be configured to transmit a supplemental content availability signal to the remote control 12 or mobile device 32 via the wide area network and/or data reader 14. Because the AC-3 data is associated with a particular video frame or set of video frames in the video signals output by the video output device 16, the supplemental content identification tool 310 can identify supplemental content (such as supplemental content 62) specific to a particular scene in a video program, or even to a specific video frame or set of video frames in a video program.

The supplemental content retrieval tool 315 includes hardware, software, and/or firmware generally operative to retrieve supplemental content (such as supplemental content 62) identified by the supplemental content identification tool 310 from the supplemental content database 29. After retrieving the supplemental content, the supplemental content retrieval tool is configured to forward the retrieved supplemental content to the supplemental content transmission tool 320.

The supplemental content transmission tool 320 includes hardware, software, and/or firmware generally operative to transmit retrieved supplemental content to the mobile device 32 via the wide area network 24. It will be understood that the wide area network 24 may comprise a cellular telephone network.

The data storing tool 325 includes hardware, software, and/or firmware generally operative to store data pertaining to data received from the data reader 14 or to supplemental content identified by the supplemental content identification tool 310 in the statistics database 30. The data stored in the statistics database 30 may include data pertaining to "channel churn" (e.g., how often a user changes broadcast, cable, or satellite television channels), commercial "blow off" (e.g., how often a user fast-forwards through commercial advertisements), time shifting (e.g., what television programs a user watches on a delayed basis), content interest, (e.g., what products, programs, and services a user tends to view or interact with), and time of day (e.g., the time of day that a user views video or audio content most often).

The statistics tool 330 includes hardware, software, and/or firmware generally operative to create statistical reports based upon data stored by the data storing tool 325 and to identify additional supplemental content from the supplemental content database 29 to transmit to the mobile device 32 based upon the data. The additional supplemental content may include preloaded supplemental content 78 and/or a supplemental content guide (such as supplemental content guide 80). Thus, the statistics tool 330 can reveal valuable information about user behavior and provide additional content that takes advantage of that info, illation. By tracking a user's viewing habits, the statistics tool 330 can reward a user with additional content targeted to that user's tastes. The statistics tool 330 can also gauge consumer loyalty by tracking viewing habits and a user's interactions with television advertisements. In one embodiment, the statistics tool 330 is configured to award coupons, discounts, points, reward cards, supplemental content, or other rewards to a user based upon stored data. For example, the statistics tool 330 may be configured to award rewards if a user views a certain number of television advertisements, if a user activates the user input mechanism 36 during a certain number of television advertisements, or if a user has a certain viewing profile as determined by the statistics tool 330.

Supplemental Content Presentation System

Figure 7:
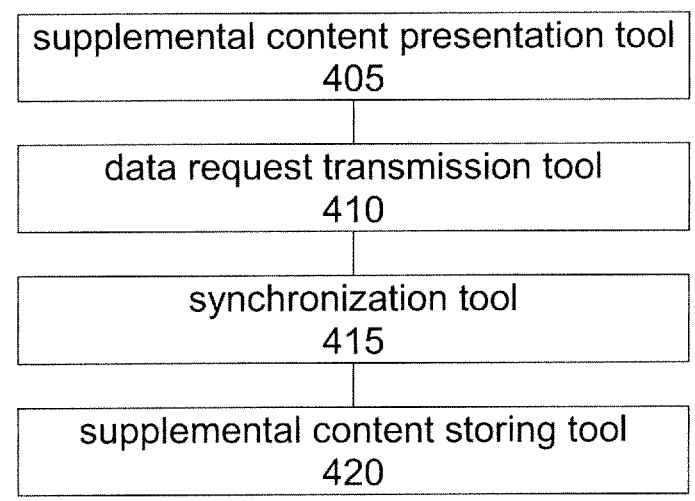
FIG. 7 is a block diagram of a supplemental content presentation system, in accordance with an embodiment of the present invention.

With reference to FIG. 7, there is shown a block diagram of a supplemental content presentation system 400 in accordance with an embodiment of the present invention. The supplemental content presentation system 400 may be implemented on the mobile device 32. The supplemental content presentation system 400 includes a supplemental content presentation tool 405, a data request transmission tool 410, a synchronization tool 415, and a supplemental content storing tool 420.

The supplemental content presentation tool 405 includes hardware, software, and/or firmware generally operative to receive supplemental content (such as supplemental content 62 and preloaded supplemental content 78) from the data server 26 via the wide area network 24 and to present the supplemental content to a user (e.g., via an LCD display and audio speaker). It will be understood that the wide area network 24 may comprise a cellular telephone network.

The data request transmission tool 410 includes hardware, software, and/or firmware generally operative to transmit a data request to the data reader 14 either directly or via the router 20. The data request transmission tool 410 can be configured to transmit a data request either at the start of the presentation of supplemental content by the supplemental content presentation tool 405, periodically during the presentation of the supplemental content, in response to cues embedded in the supplemental content, in response to software timers set by the supplemental content, and/or in response to a user input to the mobile device 32 during presentation of the supplemental content.

The synchronization tool 415 includes hardware, software, and/or firmware generally operative to receive data indicative of a digital code or series of digital codes read by the data reader 14 and to synchronize the presentation of supplemental content being presented by the supplemental content presentation tool 405 with video or audio signals being output by the video output device 16. In one embodiment, each digital code is an AC-3 code associated with a particular video frame or set of video frames in the video signals. The synchronization tool 415 thus can use the digital codes to precisely synchronize the presentation of the supplemental content with the video signals. In one embodiment, the synchronization tool accomplishes this goal by (1) determining when to start presentation of the supplemental content by the supplemental content presentation tool 405; (2) skipping ahead in the supplemental content if the supplemental content has begun to lag the video signals; (3) pausing the presentation of the supplemental content if the supplemental content has begun to get ahead of the video signals; (4) determining where to restart presentation of the supplemental content if it has been paused to await user input; and (5) determining when to end presentation of the supplemental content.

The supplemental content storing tool 420 includes hardware, software, and/or firmware generally operative to store received supplemental content (such as preloaded supplemental content 78) and/or a supplemental content guide (such as supplemental content guide 80) in the mobile device database 64 for later presentation to a user. In one embodiment, the preloaded supplemental content 78 and/or supplemental content guide 80 comprise date and time data 82 specifying a date and time for presentation of supplemental content by the supplemental content presentation tool 405. At the specified date and time, the supplemental content storing tool 420 can be configured to launch the supplemental content presentation tool 405 to automatically present the supplemental content to the user or to display an icon on the display 70 indicating to the user that supplemental content is available for presentation. Upon selection of the icon, the supplemental content presentation tool 405 can be configured to present the supplemental content. The synchronization tool 415 can be configured to use AC-3 data to synchronize the presentation of supplemental content 62 or preloaded supplemental content 78 with video or audio signals being output by the video output device 16, as described above.

In one embodiment, the supplemental content presentation system 400 enables the presentation of entertainment applications, such as games and pop trivia, that are synchronized with video or audio signals being output by the video output device 16. In this embodiment, the supplemental content comprises "trivia pops," "question pops," and/or "micro-games" timed to be presented while specific scenes are being viewed on the video display device 18. Trivia pops are fun facts specific to the scene being viewed. Question pops comprise a multiple choice or true-or-false question specific to the scene being viewed. Micro-games are short, party-style games designed to highlight a scene in a television program and add an element of interactivity for users. The synchronization tool 415 synchronizes the presentation of the trivia pops, question pops, and micro-games by the supplemental content presentation tool 405 with the video or audio signals being output by the video output device 16. If desired, the supplemental content storing tool 420 can save the trivia pops, question pops, and micro-games for after a television program ends.

Figure 9:
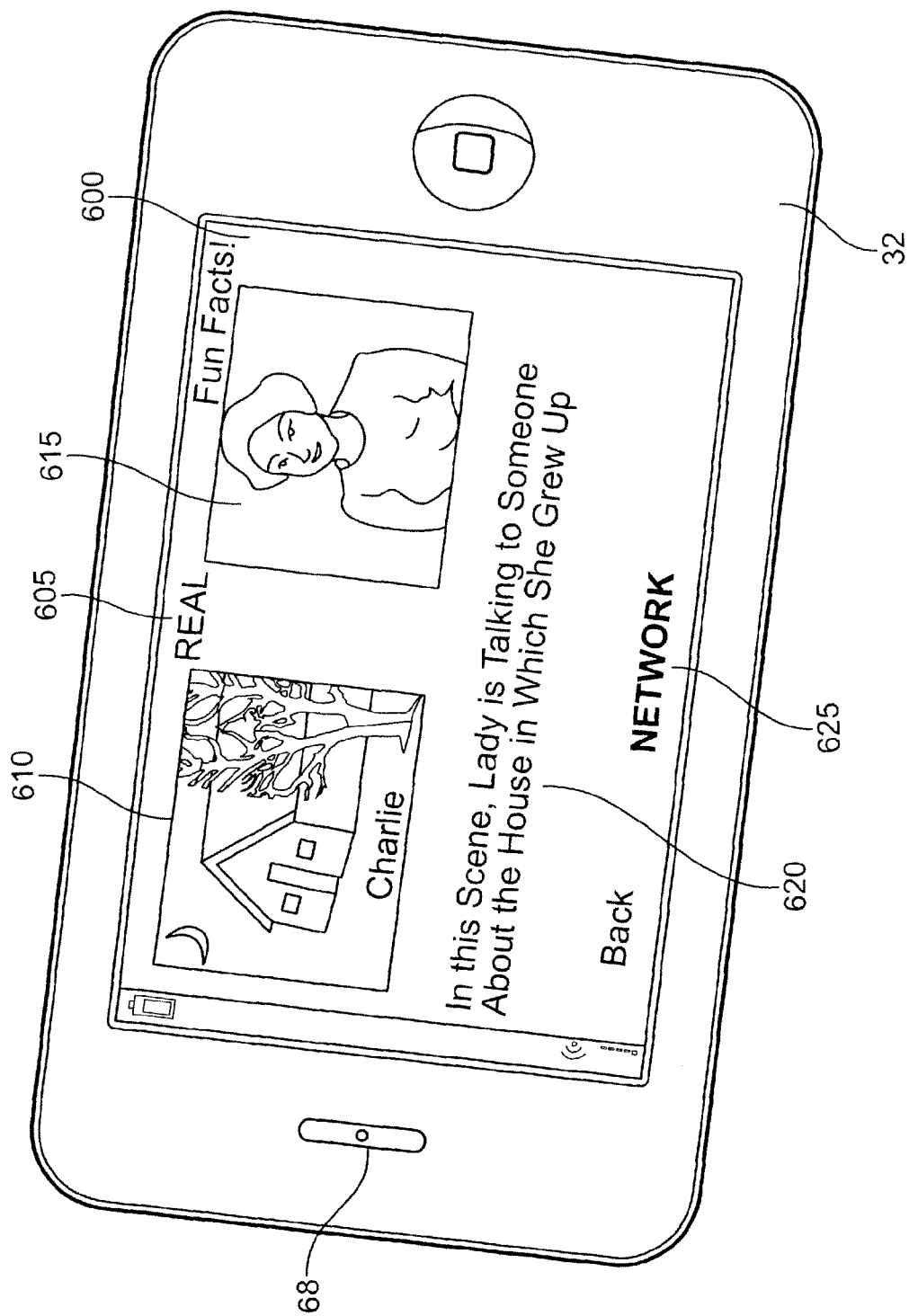
FIG. 9 is a front elevation view of a mobile device for use in the network system of FIG. 1, the mobile device displaying a screenshot of a trivia pop screen in accordance with an embodiment of the present invention.

FIG. 9 is a front elevation view of a mobile device 32 displaying a trivia pop screen 600 in accordance with an embodiment of the present invention. The trivia pop screen 600 comprises a title bar 605 showing the name of a television program associated with a trivia pop and the words "FUN FACTS!," a trivia pop picture 610 showing a picture associated with the trivia pop, a video frame picture 615 showing a video frame from a scene associated with the trivia pop, a trivia pop box 620 showing fun facts specific to the scene, and a network identification bar 625 showing the name of a television, cable, or satellite network associated with the television program.

Figure 10:
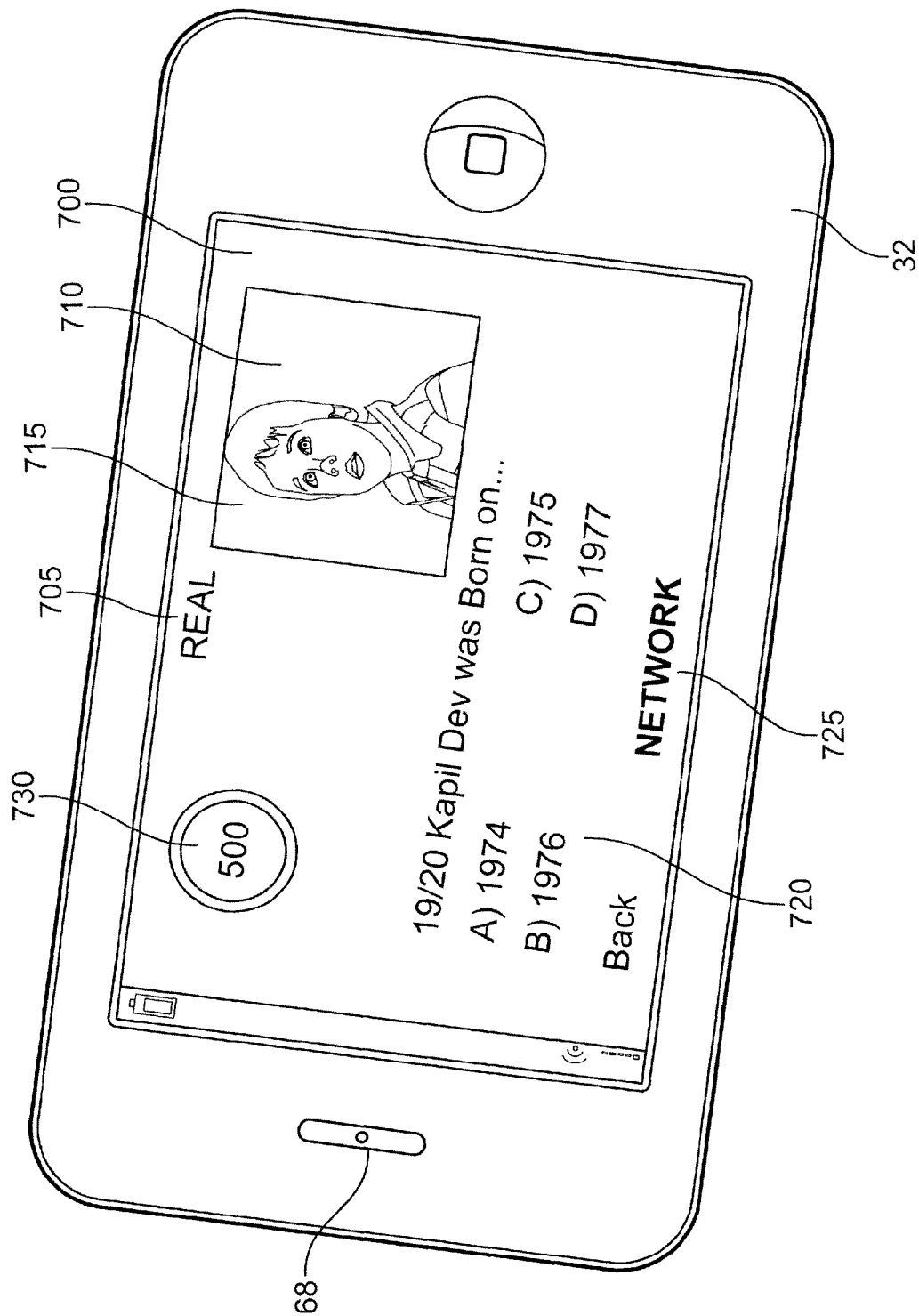
FIG. 10 is a front elevation view of a mobile device for use in the network system of FIG. 1, the mobile device displaying a screenshot of a question pop screen in accordance with an embodiment of the present invention.

FIG. 10 is a front elevation view of a mobile device 32 displaying a question pop screen 700 in accordance with an embodiment of the present invention. The question pop screen 700 comprises a title bar 705 showing the name of a television program associated with a question pop, a video frame picture 710 showing a video frame from a scene associated with the question pop, a question pop query 715, a question pop answer box 720 showing possible answers to the question pop query, and a network identification bar 725 showing the name of a television, cable, or satellite network associated with the television program. In one embodiment, the supplemental content presentation tool 405 is configured to calculate and display a "question pop" score 730 based upon how quickly and correctly the user answers the question pops.

Figure 11:
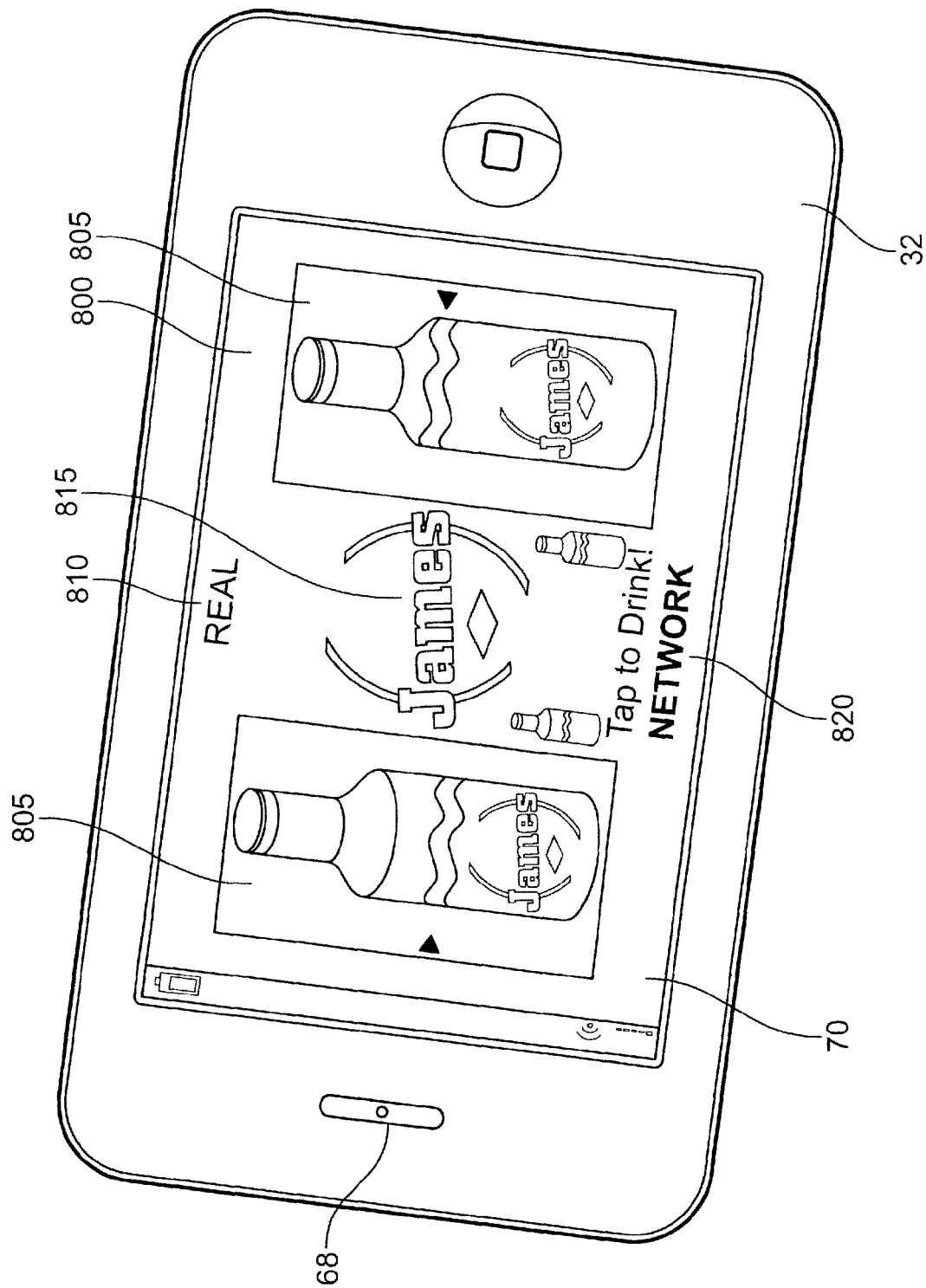
FIG. 11 is a front elevation view of a mobile device for use in the network system of FIG. 1, the mobile device displaying a screenshot of a first embodiment of a micro-game screen in accordance with an embodiment of the present invention.

FIG. 11 is a front elevation view of a mobile device 32 displaying a first embodiment of a micro-game screen 800 in accordance with an embodiment of the present invention. In one embodiment, the supplemental content presentation tool 405 is configured to provide a sensory alert to a user, indicating that a micro-game is about to start. The alert and the start of the micro-game are timed to coincide with a specific scene being viewed on the video display device 18. In the embodiment shown in FIG. 11, two pictures 805 portraying bottles of liquid appear in the micro-game screen 800. By repeatedly activating the user input mechanism 72 or by repeatedly touching the display 70 if the display 70 is a touch screen display, users compete to be the first to empty the bottles of liquid. In one embodiment, a single user can compete against a computerized player controlled by the supplemental content presentation tool 405. The micro-game screen 800 also comprises a title bar 810 showing the name of a television program associated with a micro-game, a micro-game logo 815 showing a logo associated with the micro-game, and a network identification bar 820 showing the name of a television, cable, or satellite network associated with the television program.

Figure 12:
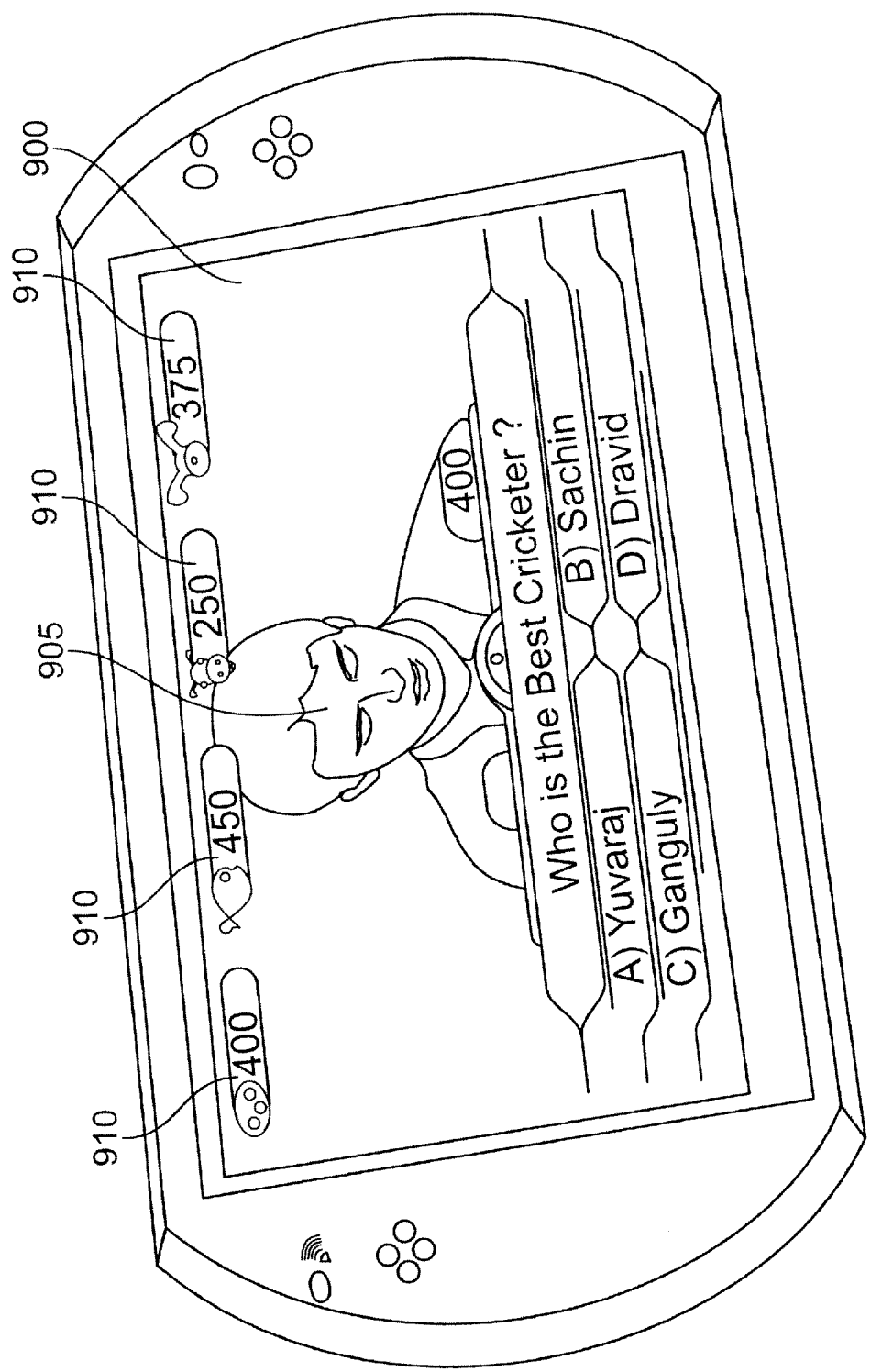
FIG. 12 is a front elevation view of a mobile device for use in the network system of FIG. 1, the mobile device displaying a screenshot of a second embodiment of a micro-game screen in accordance with an embodiment of the present invention.

FIG. 12 is a front elevation view of a mobile device displaying a second embodiment of a micro-game screen 900 in accordance with an embodiment of the present invention. This embodiment makes a game show program being presented on the video display device 18 interactive. Using video frame data (such as AC-3 data) as a time code, the supplemental content presentation tool 405 can cue, time, and judge users as they play along with or compete against an on-screen contestant 905. The micro-game screen 900 comprises one or more player score boxes 910 showing user scores. In one embodiment, the micro-game screen 900 is displayed on a touch screen display configured to register user responses to on-screen queries based upon where the user touches the display.

In one embodiment, the supplemental content presentation system 400 enables the presentation of advertising games that are synchronized with video or audio signals being output by the video output device 16. In this embodiment, the supplemental content in the form of an advertising game is timed to be presented while a specific advertisement is being viewed on the video display device 18. The advertising game allows a television advertiser to provide interactive content to users while promoting the advertiser's products or services. The data request transmission tool 410 is configured to transmit a data request to the data reader 14 at the start of a commercial break in a television program to determine whether an advertisement for which an advertising game is available is being shown on the video display device 18. Because the data request transmission tool 410 requests data specific to advertisements actually being displayed on the video display device 18, the supplemental content presentation system 400 is configured to account for differences in advertising between different geographic regions and to account for time shifting by the user through the use of a digital video recorder or similar device. The synchronization tool 415 then synchronizes the presentation of the advertising game by the supplemental content presentation tool 405 with the video or audio signals being output by the video output device 16. If desired, the supplemental content storing tool 420 can save the advertising game for after a television program ends.

Figure 13:
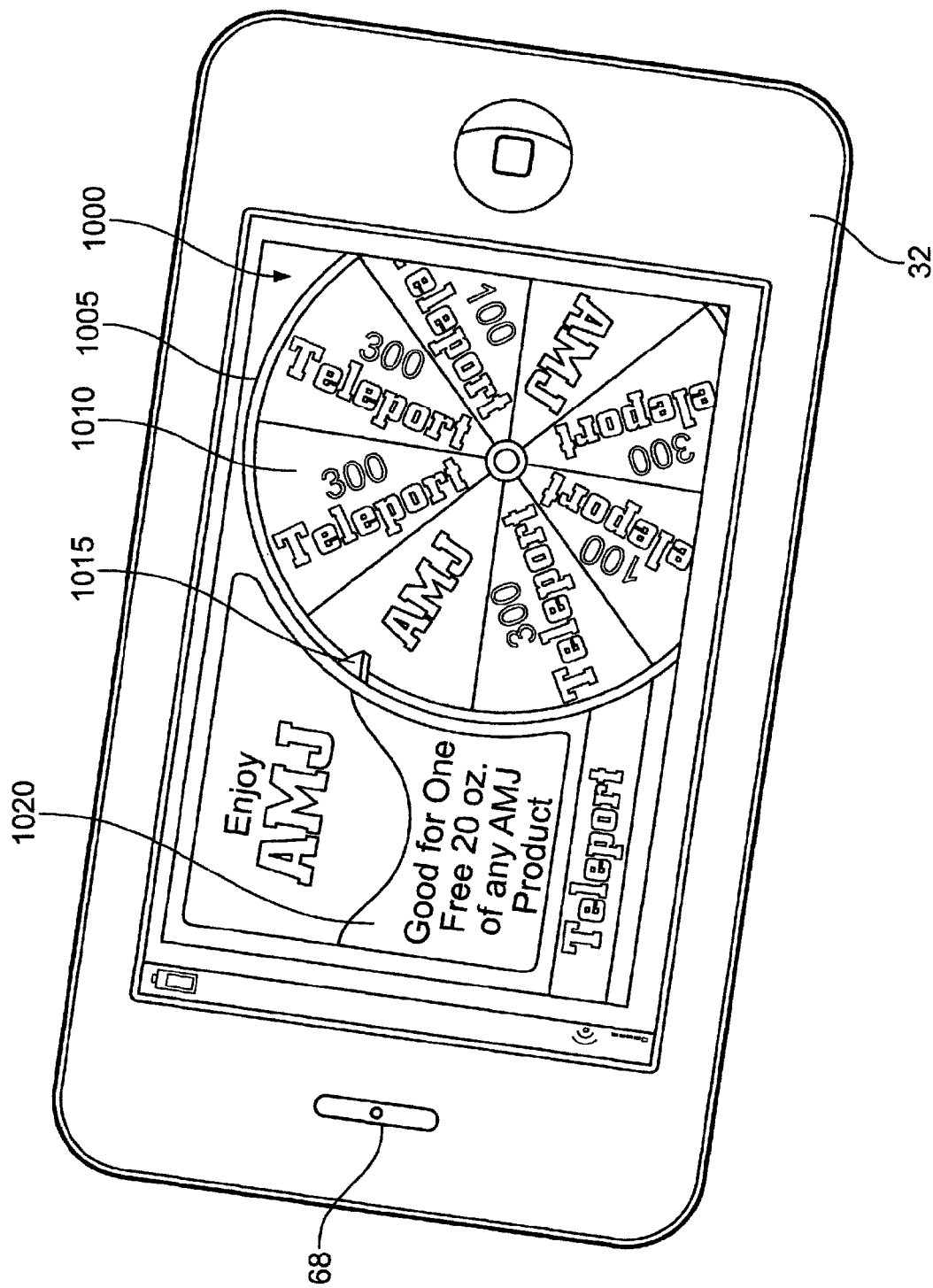
FIG. 13 is a front elevation view of a mobile device for use in the network system of FIG. 1, the mobile device displaying a screenshot of an embodiment of an advertising game screen in accordance with an embodiment of the present invention.

FIG. 13 is a front elevation view of a mobile device displaying an embodiment of an advertising game screen 1000 in accordance with an embodiment of the present invention. The advertising game screen 1000 comprises a board game-style spinner graphic 1005 having a plurality of circular sectors 1010, one or more of which display a prize that a user can win, and an arrow 1015 pointing at one of the plurality of circular sectors. The supplemental content presentation tool 405 is configured to rotate or spin the spinner graphic 1005 after a user activates a user input mechanism (such as the user input mechanism 72) or touches the display if the display is a touch screen display. The supplemental content presentation tool 405 is further configured to slow and stop the rotation of the spinner graphic 1005 after either a random or predetermined period of time, to display a prize graphic 1020 if the arrow 1015 points at a circular sector displaying a prize, and to either e-mail, fax, mail, or otherwise transmit an instant-win coupon or other award notification.

Supplemental Content Identification Method

Figure 14:
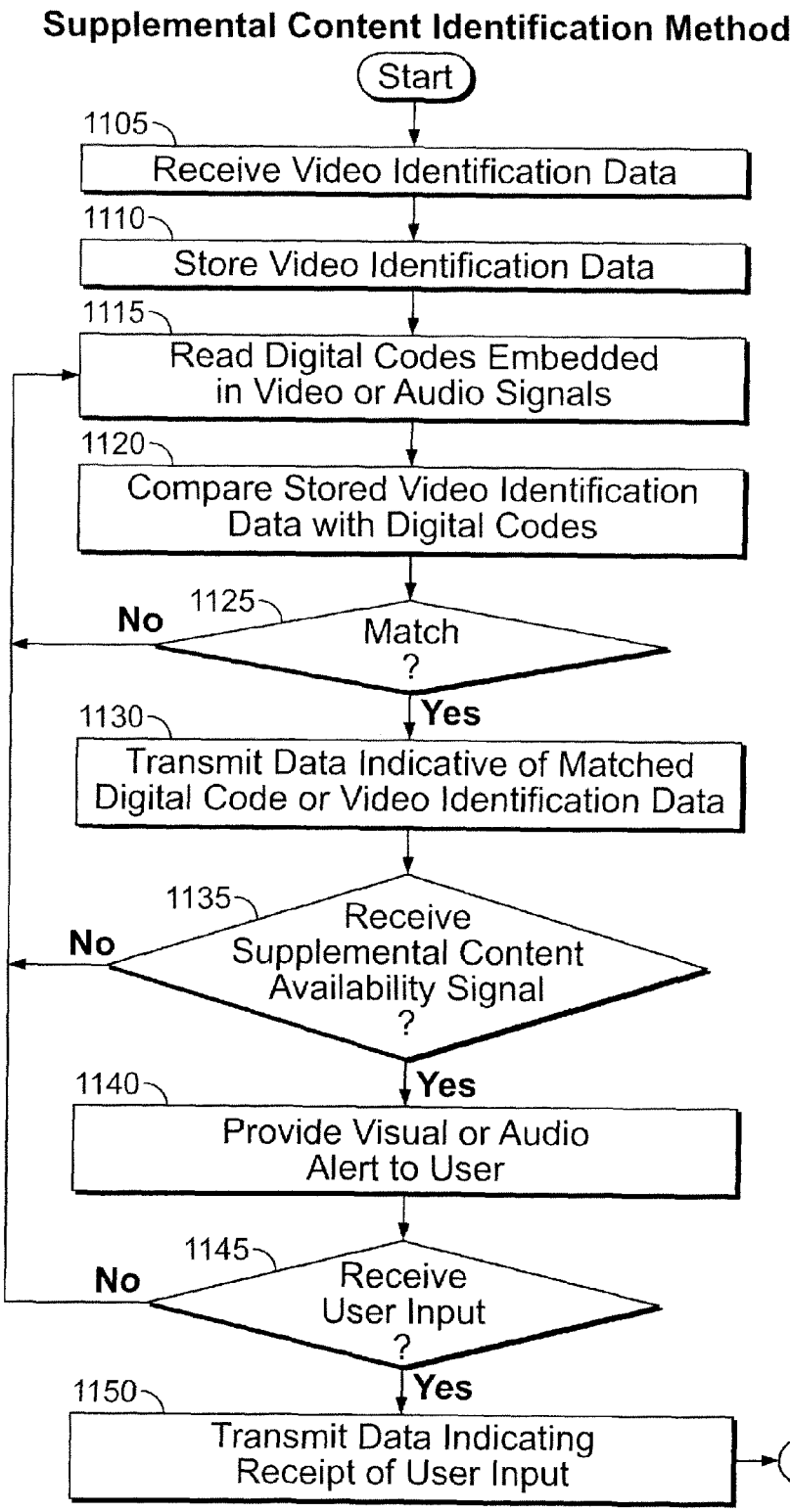
FIG. 14 is a flowchart of a supplemental content identification method, in accordance with an embodiment of the present invention.

With reference to FIG. 14, there is shown a flowchart of a supplemental content identification method 1100, in accordance with an embodiment of the present invention. The supplemental content identification method 1100 starts in step 1105, where the video identification data ("VID") storing tool 205 receives video identification data (such as video identification data 65) from the data server 26. In step 1110, the VID storing tool 205 stores the video identification data in the data reader database 66. As described above, the video identification data can comprise unique identifiers to allow the VID comparing tool 215 to identify particular video programs or even specific broadcasts of a particular video program based upon AC-3 data for the broadcasts or programs.

In step 1115, the data reading tool 210 reads digital codes embedded in video or audio signals output by the video output device 16. In one embodiment, step 1115 comprises reading Dolby Digital (AC-3) audio data embedded in the audio signals as they are output by the video output device 16.

In step 1120, the VID comparing tool 215 compares the stored video identification data with the digital codes read by the data reading tool 210. In step 1125, the VID comparing tool 215 determines whether there is a match between any of the stored video identification data and the digital codes. If there is not a match, then the supplemental content identification method 1100 returns to step 1115. If there is a match, then in step 1130 the data transmission tool 220 transmits data indicative of the matched digital code and/or the matched video identification data to the data server 26, either directly or via the router 20.

In step 1135, the user alert tool 225 waits for a predetermined period of time to receive a supplemental content availability signal from the data server 26. If the user alert tool 225 does not receive a supplemental content availability signal within the predetermined period of time, then the supplemental content identification method 1100 returns to step 1115. If the user alert tool 225 does receive the supplemental content availability signal within the predetermined period of time, then in step 1140 the user alert tool 225 provides a sensory alert to a user. In one embodiment, step 1140 involves transmitting signals to a remote control (such as remote control 12) or a mobile device (such as mobile device 32) in communication with the user alert tool 225.

In step 1145, the user input tool 230 waits for a predetermined period of time to receive a user input, such as a desire to receive supplemental content. In one embodiment, step 1145 involves waiting to receive an activation signal from the remote control 12 or the mobile device 32. If the user input tool 230 does not receive the user input within the predetermined period of time, then the supplemental content identification method 1100 returns to step 1115. If the user input tool 230 does receive the user input within the predetermined period of time, then in step 1150 the data transmission tool 220 transmits data indicating receipt of the user input to the data server 26, triggering the presentation or storage of supplemental content (such as supplemental content 62) on the mobile device.

Supplemental Content Provision Method

Figure 15:
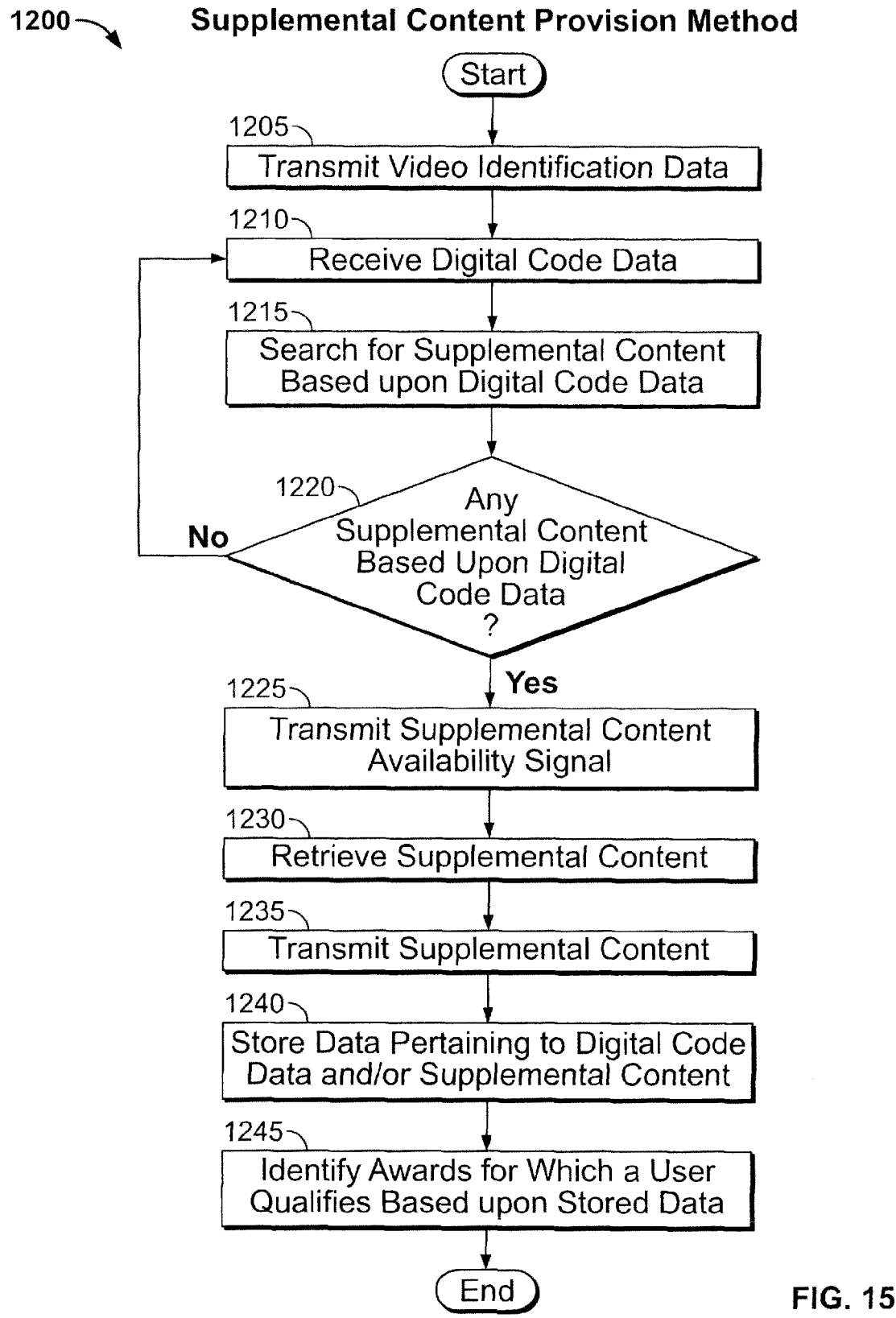
FIG. 15 is a flowchart of a supplemental content provision method, in accordance with an embodiment of the present invention.

With reference to FIG. 15, there is shown a flowchart of a supplemental content provision method 1200, in accordance with an embodiment of the present invention. The supplemental content provision method 1200 starts in step 1205, where the video identification data ("VID") transmission tool 305 transmits video identification data (such as video identification data 65) to the data reader 14 via the wide area network 24. As described above, the video identification data can comprise unique identifiers to allow the data reader 14 to identify particular video programs or even specific broadcasts of a particular video program based upon AC-3 data for the broadcasts or programs.

In step 1210, the supplemental content identification tool 310 receives, via the wide area network 24, digital code data from the data reader 14. In step 1215, the supplemental content identification tool 310 searches for supplemental content (such as product information, advertisement data, game content, and interactive content) based upon the digital code data. In one embodiment, step 1215 involves comparing Dolby Digital (AC-3) audio data received from the data reader 14 with video identification data (such as video identification data 65) stored in the media mapping database 28. In step 1220, the supplemental content identification tool 310 determines whether there is any supplemental content that is associated with the digital code data. In one embodiment, step 1220 involves determining whether there is a match between any of the video identification data and the Dolby Digital (AC-3) audio data. If there is not supplemental content associated with the digital code data, then the supplemental content provision method 1200 returns to step 1210. If there is supplemental content associated with the digital code data, then in step 1225 the supplemental content identification tool 310 transmits a supplemental content availability signal to the remote control 12 or mobile device 32 via the wide area network and/or data reader 14. In one embodiment, because the AC-3 data is associated with a particular video frame or set of video frames in the video signals output by the video output device 16, the supplemental content provision method 1200 can be used to identify supplemental content (such as supplemental content 62) specific to a particular scene in a video program, or even to a specific video frame or set of video frames in a video program.

In step 1230, the supplemental content retrieval tool 315 retrieves supplemental content (such as supplemental content 62) identified in step 1215 from the supplemental content database 29. In step 1235, the supplemental content transmission tool 320 transmits the retrieved supplemental content to the mobile device 32 via the wide area network 24. As described above, it will be understood that the wide area network 24 may comprise a cellular telephone network.

In step 1240, the data storing tool 325 stores data pertaining to the data received in step 1210 and/or to supplemental content identified in step 1215 in the statistics database 30. In one embodiment, step 1240 involves storing data pertaining to "channel churn" (e.g., how often a user changes broadcast, cable, or satellite television channels), commercial "blow off" (e.g., how often a user fast-forwards through commercial advertisements), time shifting (e.g., what television programs a user watches on a delayed basis), content interest, (e.g., what products, programs, and services a user tends to view or interact with), and time of day (e.g., the time of day that a user views video or audio content most often).

In step 1245, the statistics tool 330 analyzes the stored data to identify rewards, if any, for which a user qualifies based upon the user's viewing habits. In one embodiment, step 1245 involves awarding award coupons, discounts, points, reward cards, additional supplemental content (such as preloaded supplemental content 78), and/or a supplemental content guide (such as supplemental content guide 80) based upon the stored data. An award may be made if a user views a certain number of television advertisements, if a user activates the user input mechanism 36 during a certain number of television advertisements, or if a user has a certain viewing profile as determined in step 1245.

Supplemental Content Presentation Method

Figure 16:
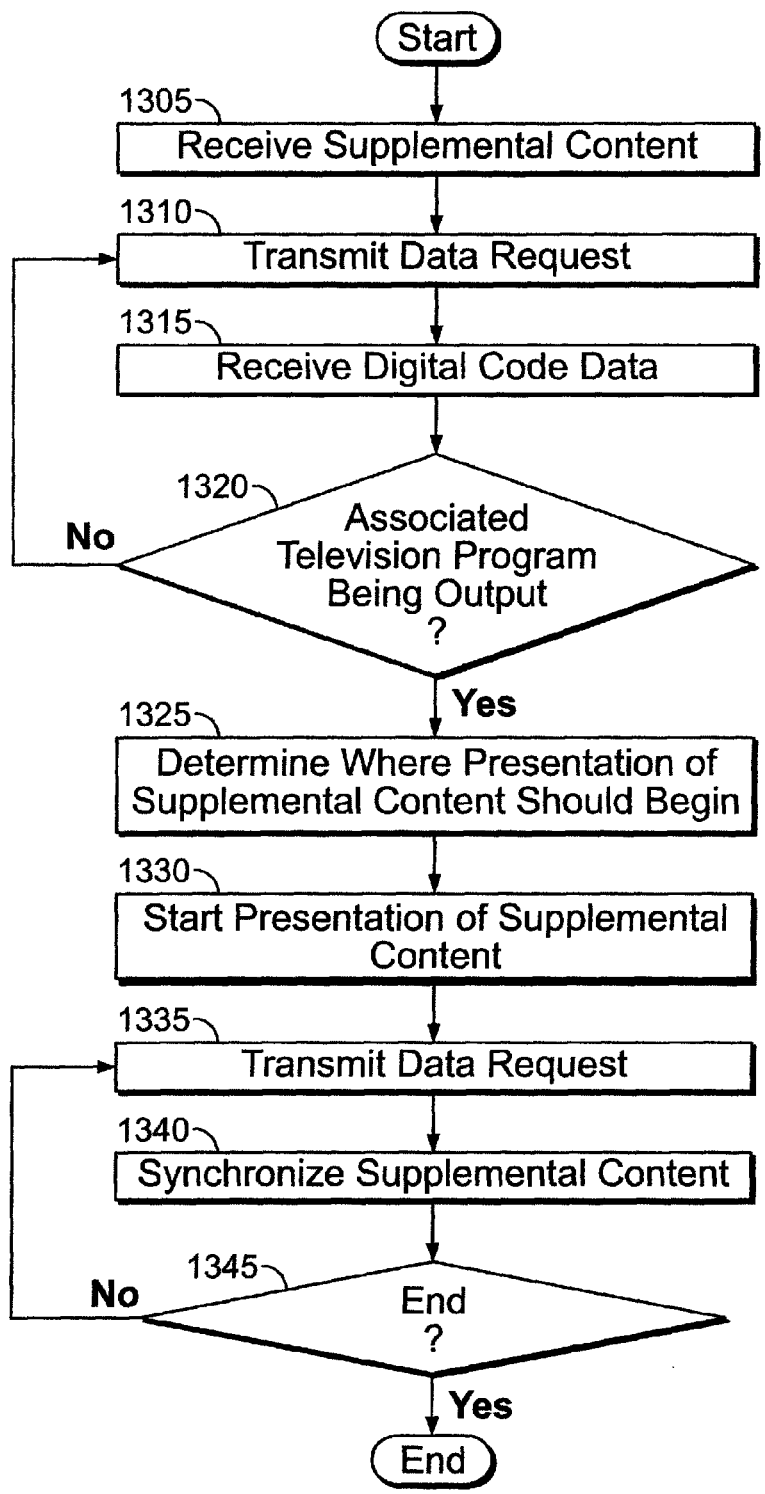
FIG. 16 is a flowchart of a supplemental content presentation method, in accordance with an embodiment of the present invention.

With reference to FIG. 16, there is shown a flowchart of a supplemental content presentation method 1300, in accordance with an embodiment of the present invention. The supplemental content presentation method 1300 starts in step 1305, where the supplemental content presentation tool 405 receives supplemental content (such as supplemental content 62 or preloaded supplemental content 78) from the data server 26 via the wide area network 24. As described above, it will be understood that the wide area network 24 may comprise a cellular telephone network. In step 1310, the data request transmission tool 410 transmits a data request to the data reader 14 either directly or via the router 20.

In step 1315, the synchronization tool 415 receives digital code data from the data reader 14. In step 1320, the synchronization tool 415, using the digital code data, determines whether a television program associated with the received supplemental content is then being output by the video output device 16. If the associated television program is not being output by the video output device 16, then the supplemental content presentation method 1300 returns to step 1310. If the associated television program is being output by the video output device 16, then in step 1325 the synchronization tool 415 determines where in the supplemental content the presentation of that supplemental content should begin. For example, if the video output device is outputting the start of the associated television program, then the synchronization tool 415 determines that the presentation of the supplemental content should begin at the start of the supplemental content. If the video output device is outputting the start of the second scene of the associated television program, then the synchronization tool 415 determines that the presentation of the supplemental content should begin at that part of the supplemental content associated with the start of the second scene.

In step 1330, the supplemental content presentation tool 405 starts the presentation of the supplemental content to a user (e.g., via an LCD display and audio speaker) based upon the determination made in step 1325. In step 1335, the data request transmission tool transmits another data request to the data reader 14. Step 1335 may be performed periodically during the presentation of the supplemental content, in response to cues embedded in the supplemental content, in response to software timers set by the supplemental content, and/or in response to a user input during presentation of the supplemental content.

In step 1340, the synchronization tool 415 synchronizes the presentation of supplemental content being presented in step 1330 with video or audio signals being output by the video output device 16. As described above, each digital code can be an AC-3 code associated with a particular video frame or set of video frames in the video signals. The digital codes thus can be used in step 1340 to precisely synchronize the presentation of the supplemental content with the video signals. In one embodiment, step 1340 involves (1) skipping ahead in the supplemental content if the supplemental content has begun to lag the video signals; (2) pausing the presentation of the supplemental content if the supplemental content has begun to get ahead of the video signals; (3) determining where to restart presentation of the supplemental content if it has been paused to await user input; and (4) determining when to end presentation of the supplemental content. If in step 1345 the synchronization tool 415 determines that presentation of the supplemental content should end, then the supplemental content presentation method 1300 ends. If in step 1345 the synchronization tool 415 does not determines that presentation of the supplemental content should end, then the supplemental content presentation method 1300 returns to step 1335.

The foregoing description of the preferred embodiments of the present invention is by way of example only, and other variations and modifications of the above-described embodiments and methods are possible in light of the foregoing teaching. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application-specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A system for synchronizing a mobile device with video signals output by a video output device, the system comprising:
    a data reader configured to be connected to the video output device for reading digital codes embedded in video or audio signals output by the video output device;
    a remote control comprising a user input mechanism and configured to transmit an activation signal to the data reader after activation of the user input mechanism; and
    a router configured to be connected to a wide area network for transmitting data from the data reader to a remote data server, the router also configured to establish a local data connection between the data reader and the mobile device;
    wherein the data reader, after receiving an activation signal from the remote control, is further configured to transmit data indicative of a digital code or series of digital codes read by the data reader to the remote data server;
    wherein the data reader, after receiving a request signal from the mobile device, is further configured to transmit data indicative of a digital code or series of digital codes read by the data reader to the mobile device; and
    wherein each of the digital codes read by the data reader is associated with a video frame or set of video frames in the video signals output by the video output device.

2. The system of claim 1, wherein the remote control further comprises
    a microcontroller unit configured to receive a supplemental content availability signal indicating that the data reader has detected a video or audio signal for which supplemental content is available, and
    an indicator light operatively connected to the microcontroller unit and configured to illuminate after the microcontroller unit receives the supplemental content availability signal.

3. The system of claim 1, wherein
    the remote control is implemented on the mobile device;
    the user input mechanism is a touch screen on the mobile device; and
    the touch screen is configured to display a supplemental content availability indicator after the remote control receives a supplemental content availability signal indicating that the data reader has detected a video or audio signal for which supplemental content is available.

4. The system of claim 1, wherein the data reader is further configured to transmit a supplemental content availability signal to the remote control indicating that the data reader has detected a video or audio signal for which supplemental content is available.

5. The system of claim 1, wherein the data reader and router are combined into one unit.

6. The system of claim 1, wherein the data reader is further configured to
    store video identification data,
    compare stored video identification data with digital codes read by the data reader, and
    transmit data indicative of a digital code or series of digital codes read by the data reader to the remote data server upon finding a match between the stored video identification data and digital codes read by the data reader.

7. A supplemental content identification system comprising:
    a data reading tool configured to be connected to a video output device for reading digital codes embedded in video or audio signals output by the video output device;
    a data transmission tool operatively connected to the data reading tool and configured to be connected to a wide area network for transmitting data indicative of a digital code or series of digital codes read by the data reading tool to a remote data server;
    a user alert tool operatively connected to the data reading tool and configured to provide a sensory alert after the data reading tool detects a video or audio signal for which supplemental content is available;
    wherein each of the digital codes read by the data reading tool is associated with a video frame or set of video frames in a video program;
    a video identification data storing tool configured to be connected to the wide area network, to receive video identification data from the remote data server, and to store the video identification data in a memory;
    a video identification data comparing tool operatively connected to the video identification data storing tool and configured to compare stored video identification data with digital codes read by the data reading tool, determine whether any of the digital codes read by the data reading tool matches any of the stored video identification data, and forward matched distal codes to the data transmission tool;
    wherein the data transmission tool is further configured to establish a local data connection to a mobile device, receive a request signal from the mobile device over the local data connection, and transmit data indicative of a digital code or series of digital codes read by the data reading tool to the mobile device after receipt of a request signal;
    a user input tool operatively connected to the data transmission tool;
    wherein the user alert tool is configured to provide the sensory alert by transmitting signals to a mobile device in communication with the user alert tool;
    wherein the user input tool is configured to register a user input by receiving an activation signal from the mobile device; and
    wherein the data transmission tool is configured to transmit data indicative of a digital code or series of digital codes read by the data reading tool to the remote data server after the user input tool receives an activation signal from the mobile device.

\* \* \* \* \*

UNITED STATES PATENT AND TRADEMARK OFFICE
CERTIFICATE OF CORRECTION

PATENT NO. : 8,463,100 B2
APPLICATION NO. : 12/753780
DATED : June 11, 2013
INVENTOR(S) : Hon Kwan Tse et al.

It is certified that error appears in the above-identified patent and that said Letters Patent is hereby corrected as shown below:

In the Specification

Column 1, line 9: "lion" should be -- Hon --.

Column 3, line 1: "con figured" should be -- configured --.

Column 4, line 22: "t le" should be -- the --.

Column 5, line 61: "or video" should be -- of video --.

Column 7, line 48: "RE" should be -- RF --.

Column 9, line 2: "device via" should be -- device 32 via --.

Column 9, line 46: "use" should be -- uses --.

Column 11, line 65: "YID" should be -- VID --.

Column 14, line 56: "info, illation." should be -- information. --.

In the Claims

Column 22, line 48: "distal" should be -- digital --.

Signed and Sealed this
Thirtieth Day of July, 2013

Teresa Stanek Rea
*Acting Director of the United States Patent and Trademark Office*